US010146785B2

(12) United States Patent
Desineni et al.

(10) Patent No.: US 10,146,785 B2
(45) Date of Patent: Dec. 4, 2018

(54) OPERATOR-GUIDED APPLICATION CRAWLING ARCHITECTURE

(71) Applicant: Samsung Electronics Co., Ltd., Suwon-si, Gyeonggi-do (KR)

(72) Inventors: Kalyan Desineni, Mountain View, CA (US); Manikandan Sankaranarasimhan, Fremont, CA (US); Sudhir Mohan, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 14/868,294

(22) Filed: Sep. 28, 2015

(65) Prior Publication Data

US 2016/0335349 A1    Nov. 17, 2016

Related U.S. Application Data

(60) Provisional application No. 62/193,051, filed on Jul. 15, 2015, provisional application No. 62/161,253, filed on May 13, 2015.

(51) Int. Cl.
*G06F 17/30* (2006.01)
*H04L 29/08* (2006.01)
*G06F 3/0484* (2013.01)

(52) U.S. Cl.
CPC .... *G06F 17/30156* (2013.01); *G06F 3/04842* (2013.01); *G06F 3/04847* (2013.01);
(Continued)

(58) Field of Classification Search
CPC .................................................. G06F 17/30864
See application file for complete search history.

(56) References Cited

U.S. PATENT DOCUMENTS 6,782,350 B1    8/2004   Burnley et al.
7,472,413 B1   12/2008   Mowshowitz
(Continued)

OTHER PUBLICATIONS

Article entitled "App Indexing & The New Frontier Of SEO: Google Search + Deep Linking", by Grossman, dated Aug. 12, 2015.*

(Continued)

*Primary Examiner* — Mahesh H Dwivedi
(74) *Attorney, Agent, or Firm* — Jefferson IP Law, LLP

(57) ABSTRACT

A system for automated acquisition of content from an application includes a guide tracker module, a link extraction controller, and a scraper. The guide tracker module monitors interaction of an operator with an executing instance of the application and records a set of guides. Each guide includes a recorded sequence of user interface interactions concluding at a respective ultimate state of the application. The link extraction controller, for each guide of the set of guides, selectively identifies additional states of the application that correspond to the respective ultimate state and adds the additional states corresponding to the respective ultimate state and the respective ultimate state to a state list. The additional states and the respective ultimate state are all directly reachable from a common penultimate state of the application. Each entry in the state list designates a state and a path of user interface interactions to arrive at the state.

23 Claims, 11 Drawing Sheets

(52) U.S. Cl.
CPC .... *G06F 17/3053* (2013.01); *G06F 17/30489* (2013.01); *G06F 17/30563* (2013.01); *G06F 17/30864* (2013.01); *G06F 17/30867* (2013.01); *G06F 17/30873* (2013.01); *G06F 17/30882* (2013.01); *G06F 17/30958* (2013.01); *H04L 67/02* (2013.01)

(56) References Cited

U.S. PATENT DOCUMENTS

| | | |
|---|---|---|
| 8,145,521 B2 | 3/2012 | Sah et al. |
| 8,341,538 B1 | 12/2012 | Antczak et al. |
| 8,489,573 B2 | 7/2013 | Bain |
| 8,595,186 B1 | 11/2013 | Mandyam et al. |
| 8,630,994 B2 | 1/2014 | Greene |
| 8,694,496 B2 | 4/2014 | Erickson |
| 9,177,058 B2 | 11/2015 | Camelo et al. |
| 9,318,108 B2 | 4/2016 | Gruber et al. |
| 9,747,191 B1 | 8/2017 | Marolia et al. |
| 9,753,627 B2 | 9/2017 | Chaudhri et al. |
| 9,811,250 B2 | 11/2017 | Louch |
| 2005/0278728 A1 | 12/2005 | Klementiev |
| 2006/0062426 A1 | 3/2006 | Levy et al. |
| 2008/0134138 A1 | 6/2008 | Chamieh et al. |
| 2009/0013307 A1 | 1/2009 | Raghavan et al. |
| 2011/0314534 A1 | 12/2011 | James |
| 2012/0054057 A1 | 3/2012 | O'Connell et al. |
| 2012/0278793 A1 | 11/2012 | Jalan et al. |
| 2012/0284247 A1* | 11/2012 | Jiang ............... G06F 17/30867 707/706 |
| 2013/0332442 A1* | 12/2013 | Liu .................. G06F 17/30864 707/709 |
| 2013/0346382 A1 | 12/2013 | Varthakavi |
| 2014/0006129 A1 | 1/2014 | Heath |
| 2014/0236919 A1* | 8/2014 | Liu .................. G06F 17/30864 707/710 |
| 2014/0250106 A1* | 9/2014 | Shapira ............. G06F 17/30864 707/722 |
| 2015/0154644 A1* | 6/2015 | Saxena .............. G06Q 30/0269 705/14.66 |
| 2015/0169772 A1 | 6/2015 | Alonso et al. |
| 2015/0178348 A1* | 6/2015 | Rohde .............. G06F 17/30377 707/734 |
| 2015/0286355 A1* | 10/2015 | Prasad ................ G06F 11/3668 715/763 |
| 2015/0379128 A1* | 12/2015 | Chang .............. G06F 17/30864 707/711 |
| 2016/0019206 A1 | 1/2016 | Mysur et al. |
| 2016/0027045 A1 | 1/2016 | Kurian et al. |
| 2016/0234330 A1* | 8/2016 | Popowitz ........... H04L 67/2814 |
| 2016/0254970 A1* | 9/2016 | Bartholomew ....... H04L 43/065 709/224 |
| 2016/0335286 A1 | 11/2016 | Desineni et al. |
| 2016/0335333 A1 | 11/2016 | Desineni et al. |
| 2016/0335348 A1 | 11/2016 | Desineni et al. |
| 2016/0335356 A1 | 11/2016 | Desineni et al. |
| 2017/0083606 A1 | 3/2017 | Mohan |
| 2017/0185677 A1 | 6/2017 | Anand et al. |
| 2017/0185679 A1 | 6/2017 | Anand et al. |
| 2017/0357721 A1* | 12/2017 | Chernenkov ..... G06F 17/30864 |

OTHER PUBLICATIONS

Article entitled "Quixey's Search Engine Is for Actions Not Words", by Wohlsen, dated Apr. 21, 2015.*

Hao, Shuai et al. "PUMA". Proceedings of the 12th annual international conference on Mobile systems, applications, and services—MobiSys 2014, 14 pages.

Lin, Felix et al. "SPADE: Scalable App Digging with Binary Instrumentation and Automated Execution," 2013, 12 pages.

Nath, Suman et al., "App Crawler: Opening Mobile App Black Boxes," 2012, 3 pages.

* cited by examiner

OPERATOR-GUIDED APPLICATION CRAWLING ARCHITECTURE

CROSS-REFERENCE TO RELATED APPLICATIONS

This application claims the benefit of U.S. Provisional Application No. 62/161,253, filed on May 13, 2015, and U.S. Provisional Application No. 62/193,051, filed on Jul. 15, 2015. The entire disclosures of the applications referenced above are incorporated herein by reference.

FIELD

The present disclosure relates to crawling applications for content, and more particularly to crawling mobile applications for content.

BACKGROUND

Search engines are an integral part of today's world. A key component of a search engine is the collection of search indices that power the search. In the context of a search engine, a search index can be an inverted index that associates keywords or combinations of keywords to documents (e.g., web pages) that contain the keyword or combination of keywords. In order to generate and maintain these search indexes, most search engines use crawlers to identify documents and information within the documents. A traditional crawler requests a document from a content provider and the content provider provides the requested document to the crawler. The crawler then identifies and indexes the keywords and combinations of keywords in the document.

As the world transitions to a mobile-based architecture, the way content providers provide access to their content is changing. User devices can access content using a variety of different mechanisms. For example, user devices can obtain content from a content provider using a native application dedicated to accessing a software application of the content provider or a web browser that accesses the software application using a web browser. Furthermore, content providers may allow access to different content depending on the geographic region of a user device, the type of user device, the time of day, and/or the operating system of the user device. For these and other reasons, crawling has become an increasingly difficult task.

SUMMARY

A system for automated acquisition of content from an application includes a guide tracker module, a link extraction controller, and a scraper module. The guide tracker module is configured to monitor interaction of an operator with an executing instance of the application and record a set of guides. Each guide in the set of guides includes a recorded sequence of user interface interactions concluding at a respective ultimate state of the application. The link extraction controller is configured to, for each guide of the set of guides, selectively identify additional states of the application that correspond to the respective ultimate state and add the additional states corresponding to the respective ultimate state and the respective ultimate state to a state list. The additional states and the respective ultimate state are all directly reachable from a common penultimate state of the application. The common penultimate state of the application is immediately prior to the respective ultimate state in the guide. Each entry in the state list designates (i) a state and (ii) a path of user interface interactions to arrive at the state. The scraper module is configured to, within an executing instance of the application, extract text and metadata from the states designated by each of the entries in the state list. Information based on the extracted text and metadata is stored in a data store.

In other features, for each guide in the set of guides, the sequence of user interface interactions begins at a home state of the application. In other features, the guide tracker module is configured to create a new guide in the set of guides in response to the operator returning to the home state of the application. In other features, the application is executing within an emulator. In other features, the link extraction controller is configured to execute the application within a second emulator. The scraper module is configured to execute the application within a third emulator.

In other features, each path is one of (i) a sequence of user interface interactions, (ii) an application programming interface call, or (iii) an application programming interface call followed by one or more user interface interactions. In other features, the link extraction controller is configured to (i) identify that an application programming interface call is available to reach a first state directly, (ii) identify parameters for the application programming interface call that specify the first state, and (iii) incorporate the application programming interface call with the identified parameters into the path to the first state.

In other features, the link extraction controller is configured to, for each guide of the set of guides, and for each intermediate state encountered along the guide, selectively identify additional states of the application that correspond to the intermediate state and add the additional states corresponding to the intermediate state and the intermediate state to the state list. The additional states corresponding to the intermediate state and the intermediate state are all directly reachable from a common prior state of the application. The common prior state of the application is immediately prior to the intermediate state in the guide.

In other features, the system includes a target state tracker module configured to allow the operator to, while recording a guide of the set of guides, designate one or more states encountered along the guide as target states. The link extraction controller is configured to, for each designated target state, selectively identify additional states of the application that correspond to the target state and add the additional states corresponding to the target state and the target state to the state list. The additional states corresponding to the target state and the target state are all directly reachable from a common prior state of the application. The common prior state of the application is immediately prior to the target state in the respective guide.

In other features, the scraper module is configured to, for each entry in the state list, (i) reach the designated state by replaying the corresponding path to the executing application and (ii) extract the text and metadata from the designated state. In other features, a search system includes the system and the data store. The search system further includes a set generation module configured to, in response to a query from a user device, select records from the data store to form a consideration set of records. The search system further includes a set processing module configured to assign a score to each record of the consideration set of records. The search system further includes a results generation module configured to respond to the user device with a subset of the consideration set of records. The subset is selected based on the assigned scores.

A method for automated acquisition of content from an application includes monitoring interaction of an operator with an executing instance of the application. The method includes recording a set of guides according to the monitoring. Each guide in the set of guides includes a recorded sequence of user interface interactions concluding at a respective ultimate state of the application. The method includes, for each guide of the set of guides, selectively identifying additional states of the application that correspond to the respective ultimate state and adding the additional states corresponding to the respective ultimate state and the respective ultimate state to a state list. The additional states and the respective ultimate state are all directly reachable from a common penultimate state of the application. The common penultimate state of the application is immediately prior to the respective ultimate state in the guide. Each entry in the state list designates (i) a state and (ii) a path of user interface interactions to arrive at the state. The method includes, within an executing instance of the application, extracting text and metadata from the states designated by each of the entries in the state list. Information based on the extracted text and metadata is stored in a data store.

In other features, for each guide in the set of guides, the sequence of user interface interactions begins at a home state of the application. In other features, the method includes creating a new guide in the set of guides in response to the operator returning to the home state of the application. In other features, the method includes executing the application within an emulator. In other features, the method includes executing the application within a first emulator for use in monitoring the interaction of the operator, executing the application within a second emulator for use in the identifying additional states, and executing the application within a third emulator for use in the extracting text and metadata.

In other features, each path is one of (i) a sequence of user interface interactions, (ii) an application programming interface call, or (iii) an application programming interface call followed by one or more user interface interactions. In other features, the method includes identifying that an application programming interface call is available to reach a first state directly. identifying parameters for the application programming interface call that specify the first state, incorporating the application programming interface call with the identified parameters into the path to the first state.

In other features, the method includes, for each guide of the set of guides, and for each intermediate state encountered along the guide, selectively identifying additional states of the application that correspond to the intermediate state and adding the additional states corresponding to the intermediate state and the intermediate state to the state list. The additional states corresponding to the intermediate state and the intermediate state are all directly reachable from a common prior state of the application. The common prior state of the application is immediately prior to the intermediate state in the guide.

In other features, the method includes providing a user interface to the operator to allow the operator to, while recording a guide of the set of guides, designate one or more states encountered along the guide as target states. The method includes, for each designated target state, selectively identifying additional states of the application that correspond to the target state and adding the additional states corresponding to the target state and the target state to the state list. The additional states corresponding to the target state and the target state are all directly reachable from a common prior state of the application. The common prior state of the application is immediately prior to the target state in the respective guide.

In other features, the extracting and metadata includes, for each entry in the state list, (i) reaching the designated state by replaying the corresponding path to the executing application and (ii) extracting the text and metadata from the designated state. A method of operating a mobile application search system includes the above method and further includes, in response to receiving a query from a user device, selecting records from the data store to form a consideration set of records. The method further includes assigning a score to each record of the consideration set of records. The method further includes responding to the user device with a subset of the consideration set of records. The subset is selected based on the assigned scores. The subset identifies application states of applications that are relevant to the query.

In other features, a non-transitory computer-readable medium stores processor-executable instructions configured to perform any of the above methods.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example User Interface

Figure 1:
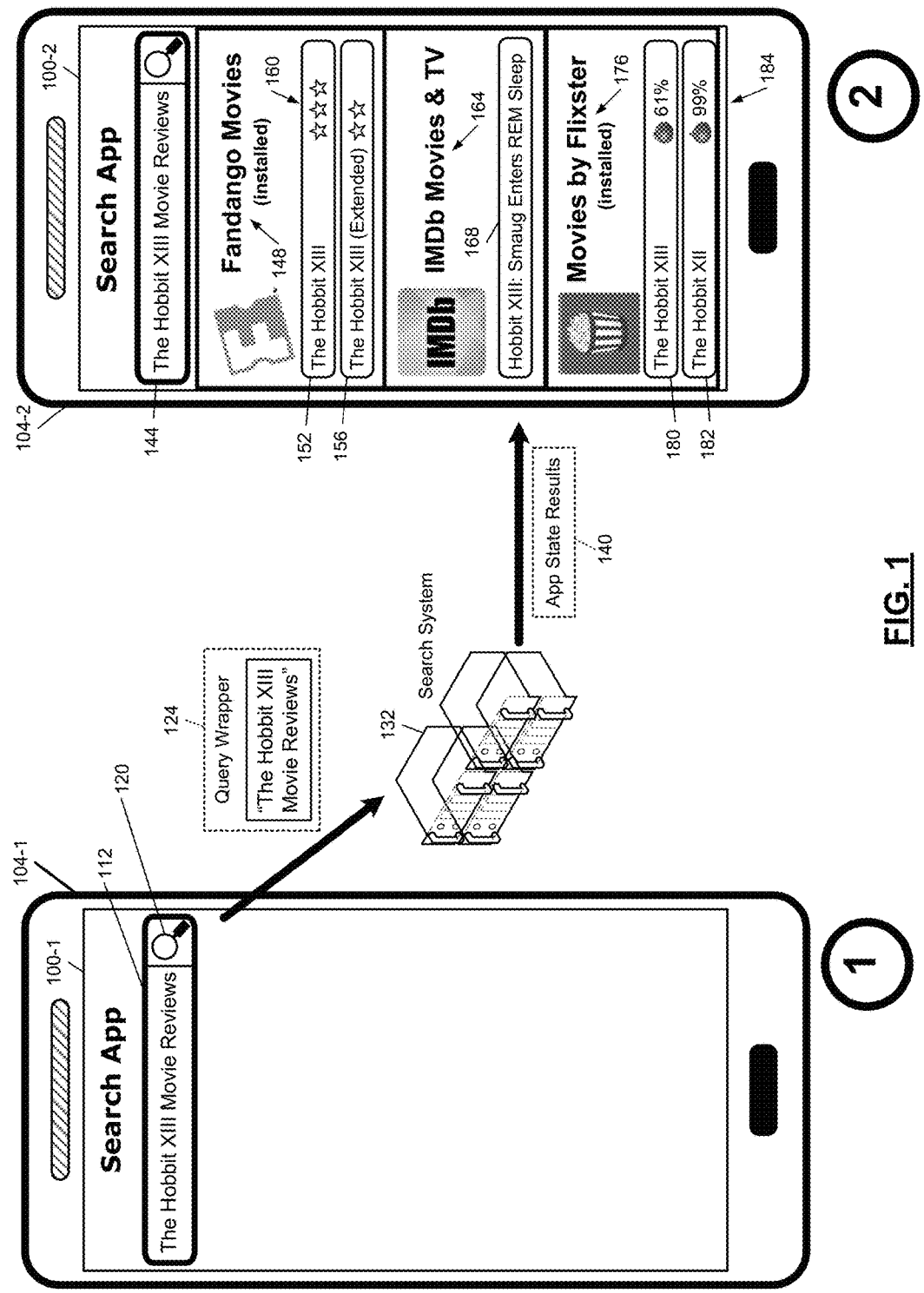
FIG. 1 is a combined functional block diagram and graphical user interface example according to the principles of the present disclosure.

In FIG. 1, an unsophisticated Search App 100 is shown running on a user device, such as smartphone 104. A first state of the Search App 100 is shown at 100-1, and the corresponding reference numeral for the smartphone 104 is 104-1. In the simple interface of the Search App 100-1, a search bar 112 allows a user to perform a search—in this case, for reviews of a (thankfully) fictional movie "The Hobbit XIII."

When a user of the Search App 100 selects (such as by tapping their finger on) a button 120 (having a magnifying glass icon), a query wrapper 124 is sent to a search system 132. Example contents of the query wrapper 124 may include a text query, such as "The Hobbit XIII Movie Reviews." Note that the text in the query wrapper 124 includes not just the function (movie reviews) but also an indication of an entity ("The Hobbit XIII") that is the target of the function. This indicates the user's intent that not only should a movie review app be shown, but preferably a state of the movie review app that directly provides reviews of The Hobbit XIII.

The search system 132, as described in more detail below, identifies relevant apps and app states based on the query wrapper 124. For example, relevant app states will generally include apps that have movie review functionality and that include a state with movie reviews of the identified entity ("The Hobbit XIII"). The search system 132 returns app state results 140 to the smartphone 104, and example contents of the app state results 140 are described in more detail below.

A graphical presentation of the app state results 140 is displayed in a state 100-2 of the Search App 100, and the corresponding reference numeral for the smartphone 104 showing the state 100-2 is 104-2. The graphical results may be displayed in a portion of the Search App 100. In various implementations, the results may slide in from one side or from the top or bottom, suggesting to the user that the results can be dismissed by swiping in an opposite direction. The search string that yielded the results may be presented to the user, such as in a textbox 144. The textbox 144 may allow the user to revise the search string in order to perform additional searches.

Each graphical result of the app state results 140 may include a header (or, title), such as the header "Fandango Movies" at 148. The header may be the same as a title of an app, and may also indicate whether the app is installed. As shown in FIG. 1 with an "installed" parenthetical, "Fandango Movies" is already installed on the smartphone 104. Other text, such as "Open," may similarly indicate that the app is already installed. Apps not yet installed may be indicated with "Download" or "Install" labels. Equivalently, icons or other visual cues may distinguish between apps that can simply be opened (including native apps and, as described in more detail below, web apps) or first need to be installed.

Two specific states are displayed with respect to the "Fandango Movies" app: "The Hobbit XIII" at 152 and "The Hobbit XIII (Extended)" at 156. This text may be the title text of the corresponding state in the "Fandango Movies" app. Additional data associated with each of these states may be shown. For example, the search system 132 may indicate that "The Hobbit XIII" state of the "Fandango Movies" app includes a 3-star rating. This 3-star rating may be shown at 160. Other data may include snippets of text (such as the first few words of a review), an image (such as a screenshot of the state), a reliability metric (such as number of user reviews), a freshness metric (such as most recent observed update to the state), etc.

These specific states may include user-selectable links directly to the corresponding entries in the "Fandango Movies" app. In other words, in response to user selection (such as by tapping the area of the screen associated with "The Hobbit XIII" 152), the Search App 100 will open the "Fandango Movies" app to the state where movie reviews are shown for "The Hobbit XIII." As described in more detail below, this direct action may be accomplished by passing an identifier of the "The Hobbit XIII" state as a parameter to the "Fandango Movies" app or by executing a script that navigates to the state for the "The Hobbit XIII" from another state of the "Fandango Movies" app.

If the user selects an area of the graphical results in the Search App 100 that is associated with the "Fandango Movies" app, but not with one of the specific states 152 or 156, the Search App 100 may open the "Fandango Movies" app to a default state. In other implementations, selecting an area not associated with one of the specific states 152 or 156 will result in no action.

A deep view card for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some deep view cards may emphasize information that led to the deep view card being selected as a search result. For example, text within the deep view card that matches a user's query may be shown in bold or italics. The deep view card may also incorporate elements that allow direct actions, such as the ability to immediately call an establishment or to transition directly to a mapping application to get navigation directions to the establishment. Other interactions with the deep view card (such as tapping or clicking any other area of the deep view card) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a deep view card includes an indication of the application or state as well as additional content from the application or state itself. The additional content allows the user to make a more informed choice about which result to choose, and may even allow the user to directly perform an action without having to navigate to the application state. If the action the user wants to take is to obtain information, in some circumstances the deep view card itself may provide the necessary information.

A deep view is presented for "IMDb Movies & TV" at 164. A user-selectable link 168 is shown for a state of the "IMDb Movies & TV" app titled "The Hobbit XIII: Smaug Enters REM Sleep." The "IMDb Movies & TV" app is not shown with an "installed" parenthetical, indicating that download and installation must first be performed.

Selecting the user-selectable link 168 may therefore trigger the opening of a digital distribution platform in either a web browser or a dedicated app, such as the app for the GOOGLE PLAY STORE digital distribution platform. The identity of the app to be downloaded (in this case, the IMDb app) is provided to the digital distribution platform so that the user is immediately presented with the ability to download the desired app. In some implementations, the download may begin immediately, and the user may be given the choice of approving installation. Upon completion of installation, control may automatically navigate to the desired state of the "IMDb Movies & TV" app—that is, the state for "The Hobbit XIII: Smaug Enters REM Sleep".

A "Movies by Flixster" app title is shown at 176, and is associated with a user-selectable link 180 for a state titled "The Hobbit XIII" and a user-selectable link 182 for a state titled "The Hobbit XII." The user-selectable link 180 includes additional data associated with the state for "The Hobbit XIII." Specifically, graphical and numerical representations of critics' reviews of the movies "The Hobbit XIII" and "The Hobbit XII" are depicted at 184.

Search Module

Figure 2:
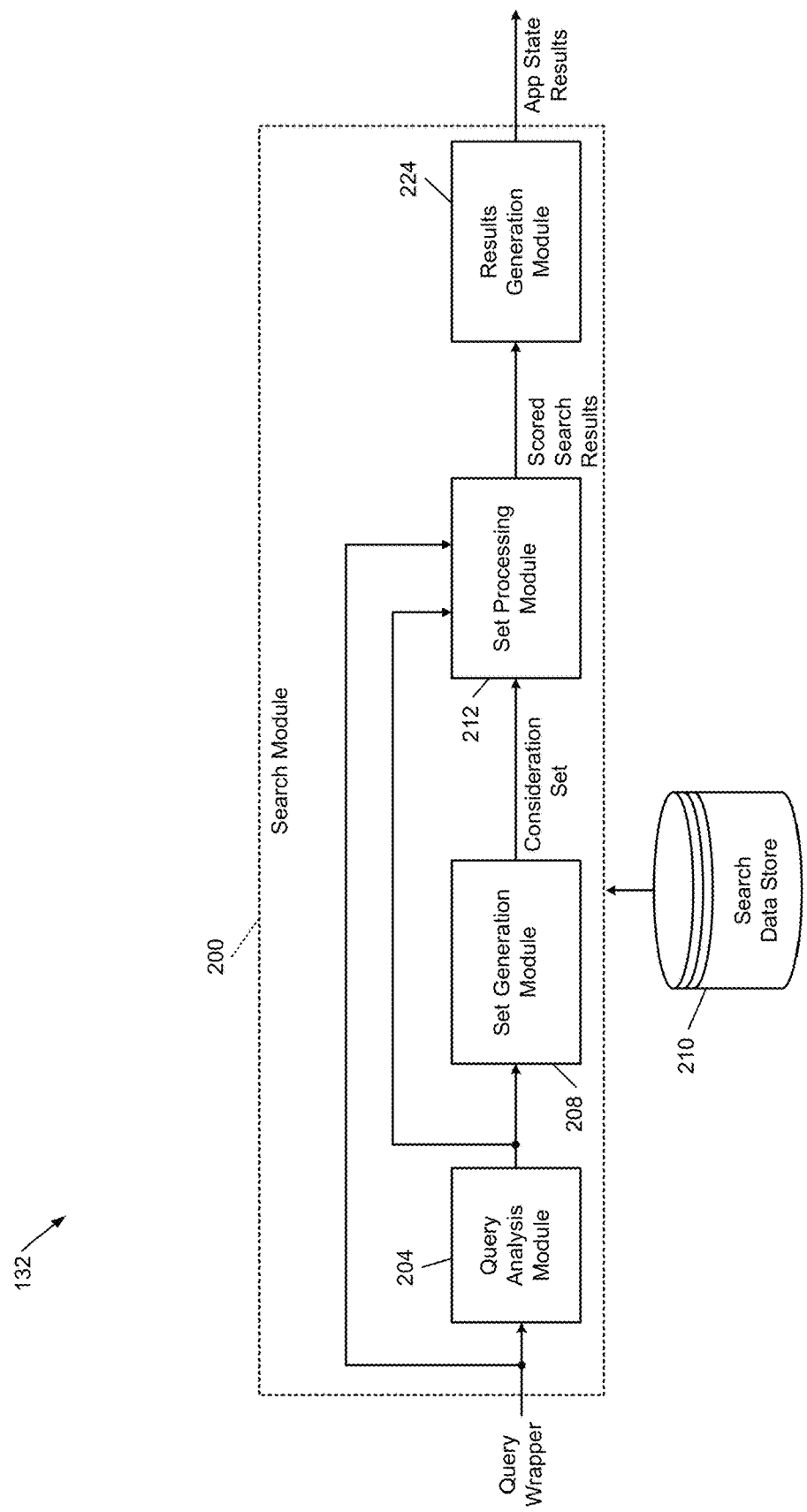
FIG. 2 is a functional block diagram of an example implementation of the search system of FIG. 1.

In FIG. 2, an example implementation of the search system 132 includes a search module 200. The search module 200 includes a query analysis module 204 that receives a query wrapper, such as the query wrapper 124 of FIG. 1. The query analysis module 204 analyzes the text query from the query wrapper. For example, the query analysis module 204 may tokenize the query text, filter the query text, and perform word stemming, synonymization, and stop word removal. The query analysis module 204 may also analyze additional data stored within the query wrapper. The query analysis module 204 provides the tokenized query to a set generation module 208.

The set generation module 208 identifies a consideration set of application state records from a search data store 210 based on the query tokens. Application (equivalently, app) state records are described in more detail in FIG. 3A and FIG. 3B. In various implementations, the search data store 210 may also include app records. In various implementations, an app record may be stored as an app state record that simply has a predetermined value, such as null, for the specific state of the app.

App state records in the search data store 210 may be generated by crawling and scraping apps according to the principles of the present disclosure. Some or all of the contents of the records of the search data store 210 may be indexed in inverted indices. In some implementations, the set generation module 208 uses the APACHE LUCENE software library by the Apache Software Foundation to identify records from the inverted indices. The set generation module 208 may search the inverted indices to identify records containing one or more query tokens. As the set generation module 208 identifies matching records, the set generation module 208 can include the unique ID of each identified record in the consideration set. For example, the set generation module 208 may compare query terms to an app state name and app attributes (such as a text description and user reviews) of an app state record.

Further, in some implementations, the set generation module 208 may determine an initial score of the record with respect to the search query. The initial score may indicate how well the contents of the record matched the query. For example, the initial score may be a function of term frequency-inverse document frequency (TF-IDF) values of the respective query terms.

A set processing module 212 receives unique IDs of app state records identified by the set generation module 208 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 212 to remove app records and/or app state records from the consideration set that match the criteria in the blacklist, or to set their score to a null value, such as zero.

The set processing module 212 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 212 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 212 may pair the search query with each app state ID and calculate a vector of features for each {query, ID} pair. The vector of features may include one or more record scoring features, one or more query scoring features, and one or more record-query scoring features. In some implementations, the set processing module 212 normalizes the scoring features in the feature vector. The set processing module 212 can set non-pertinent features to a null value or zero.

The set processing module 212 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 212 can calculate result scores for each of the IDs that the set processing module 212 receives. The set processing module 212 associates the result scores with the respective IDs and outputs the most relevant scored IDs.

A results generation module 224 may choose specific access mechanisms from the application records and app state records chosen by the set processing module 212. The results generation module 224 then prepares a results set to return to the user device. Although called "app state results" here, some of the access mechanisms may correspond to a default state (such as a home page) of an app—these may be a special case of an app state record or may be an app record.

The results generation module 224 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state.

Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 224 may generate or modify access mechanisms based on the operating system identity and version for the user device to which the results are being transmitted. For example, a script to download, install, open, and navigate to a designated state may be fully formed for a specific operating system by the results generation module 224.

If the results generation module 224 determines that none of the native access mechanisms are likely to be compatible with the user device, the search module 200 may send a web access mechanism to the user device. If no web access mechanism is available, or would be incompatible with the user device for some reason (for example, if the web access mechanism relies on the JAVA programming language, which is not installed on the user device), the results generation module 224 may omit the result.

App State Records

Figure 3:
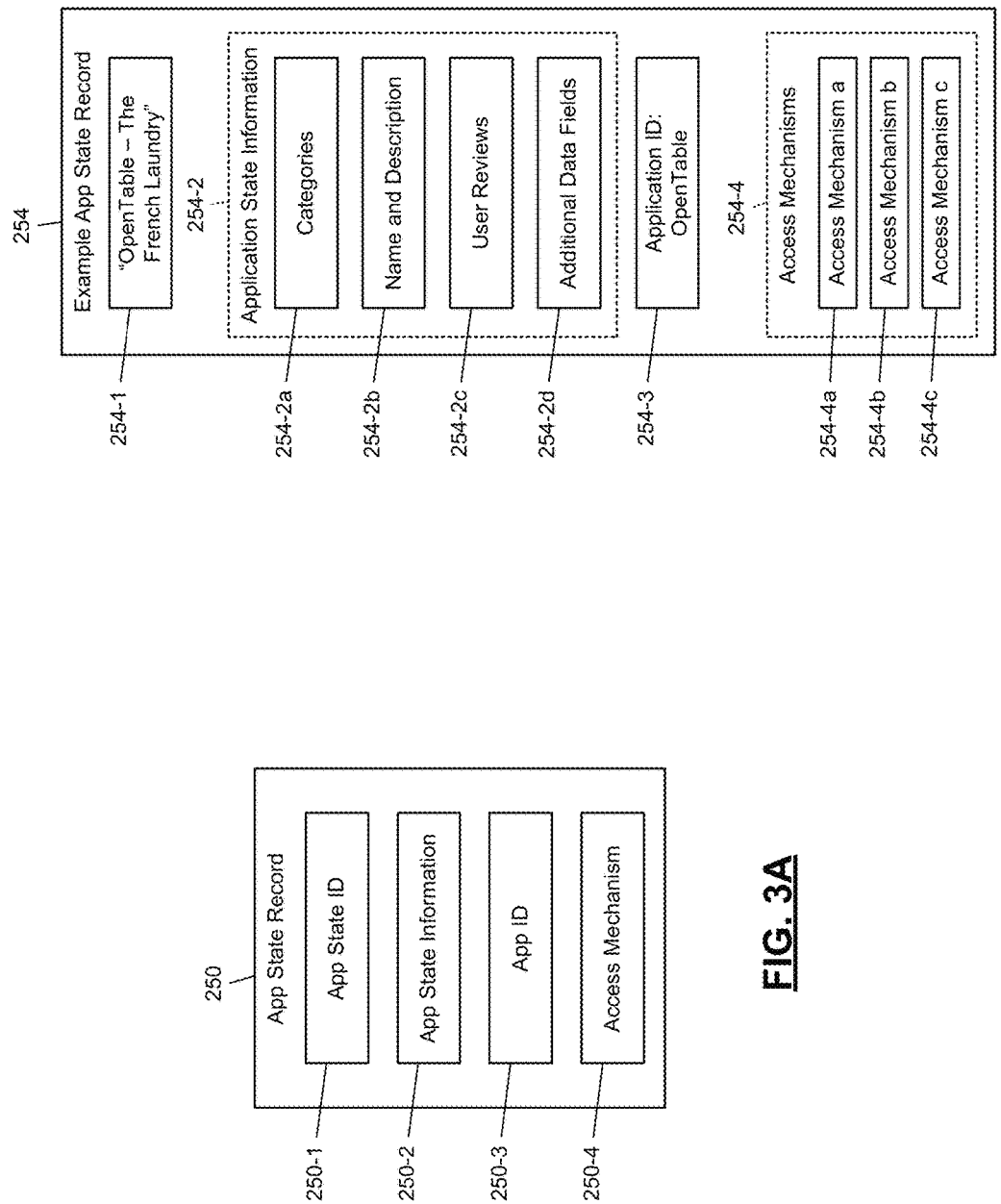
FIG. 3A is a graphical representation of an example application state record format.
FIG. 3B is a graphical representation of an example application state record according to the format of FIG. 3A.

In FIG. 3A, an example format of an app state record 250 includes an app state identifier (ID) 250-1, app state information 250-2, an app identifier (ID) 250-3, and one or more access mechanisms 250-4. The app state ID 250-1 may be used to uniquely identify the app state record 250 in the search data store 210. The app state ID 250-1 may be a string of alphabetic, numeric, and/or special (e.g., punctuation marks) characters that uniquely identifies the associated app state record 250. In some examples, the app state ID 250-1 describes the application state in a human-readable form. For example, the app state ID 250-1 may include the name of the application referenced in the access mechanisms 250-4.

In a specific example, an app state ID 250-1 for an Internet music player application may include the name of the Internet music player application along with the song name that will be played when the Internet music player application is set into the specified state. In some examples, the app state ID 250-1 is a string formatted similarly to a uniform resource locator (URL), which may include an identifier for the application and an identifier of the state within the application. In other implementations, a URL used as the app state ID 250-1 may include an identifier for the application, an identifier of an action to be provided by the application, and an identifier of an entity that is the target of the action.

For example only, see FIG. 3B, which shows an example app state record 254 associated with the OPENTABLE application from OpenTable, Inc. The OPENTABLE application is a restaurant-reservation application that allows users to search for restaurants, read reviews, and make restaurant reservations. The example app state record 254 of FIG. 3B describes an application state of the OPENTABLE application in which the OPENTABLE application accesses information for THE FRENCH LAUNDRY restaurant, a Yountville, Calif. restaurant. An app state ID 254-1 for the example app state record 254 is shown as "OpenTable—The French Laundry."

Another implementation of the displayed app state ID 254-1 is based on a triplet of information: {application, action, entity}. The triplet for the app state record 254 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 3A, the app state information 250-2 may include data that describes an app state into which an application is set according to the access mechanisms 250-4. The types of data included in the app state information 250-2 may depend on the type of information associated with the app state and the functionality specified by the access mechanisms 250-4. The app state information 250-2 may include a variety of different types of data, such as structured, semi-structured, and/or unstructured data. The app state information 250-2 may be automatically and/or manually generated and updated based on documents retrieved from various data sources, which may include crawling of the apps themselves.

In some examples, the app state information 250-2 includes data presented to a user by an application when in the app state corresponding to the app state record 250. For example, if the app state record 250 is associated with a shopping application, the app state information 250-2 may include data that describes products (such as names and prices) that are shown in the app state corresponding to the app state record 250. As another example, if the app state record 250 is associated with a music player application, the app state information 250-2 may include data that describes a song (such as by track name and artist) that is played or displayed when the music player application is set to the specified app state.

When the app state record 250 corresponds to a default state of an application, the app state information 250-2 may include information generally relevant to the application and not to any particular app state. For example, the app state information 250-2 may include the name of the developer of the application, the publisher of the application, a category (e.g., genre) of the application, a text description of the application (which may be specified by the application's developer), and the price of the application. The app state information 250-2 may also include security or privacy data about the application, battery usage of the application, and bandwidth usage of the application. The app state information 250-2 may also include application statistics, such as number of downloads, download rate (for example, average downloads per month), download velocity (for example, number of downloads within the past month as a percentage of total downloads), number of ratings, and number of reviews.

In FIG. 3B, the example app state record 254 includes app state information 254-2, including a restaurant category field 254-2a of THE FRENCH LAUNDRY restaurant, a name and text description field 254-2b of THE FRENCH LAUNDRY restaurant, user reviews field 254-2c of THE FRENCH LAUNDRY restaurant, and additional data fields 254-2d.

The restaurant category field 254-2a may include multiple categories under which the restaurant is categorized, such as the text labels "French cuisine" and "contemporary." The name and description field 254-2b may include the name of the restaurant ("The French Laundry") and text that describes the restaurant. The user reviews field 254-2c may include text of user reviews for the restaurant. The additional data fields 254-2d may include additional data for the restaurant that does not specifically fit within the other defined fields, such as a menu, prices, and operating hours.

Continuing with FIG. 3A, the app ID 250-3 uniquely identifies an application associated with the app state record 250. For example, a value for application ID 254-3 in the app state record 254 uniquely identifies the OpenTable application. The application ID 254-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 250-4 specify one or more ways that the state specified by the app state record 250 can be accessed. For any given user device, only some of the access mechanisms 250-4 may be relevant. For illustration, the example app state record 254 depicts three access mechanisms 254-4, including access mechanism "a" 254-4a, access mechanism "b" 254-4b, and access mechanism "c" 254-4c.

For example, the access mechanism 250-4a may include a reference to a native IOS operating system edition of the OPENTABLE application along with one or more operations to be performed by the user device. For example, the access mechanism 250-4a may include an application resource identifier for the native iOS edition of the OPENTABLE application and one or more operations that navigate to the state in the OPENTABLE application for THE FRENCH LAUNDRY restaurant.

The access mechanism 250-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 250-4c may include a reference to a web edition of the OPENTABLE application, such as a URL that corresponds to a web page for THE FRENCH LAUNDRY restaurant on the OPENTABLE web site.

Guided Crawling

Guided crawling determines which states of an app are most important (i.e., that should be crawled and scraped) with operator assistance. Instead of trying to exhaustively discover every state of an app through an unguided crawl, an operator can help focus the crawler on only the most interesting or important states.

An operator browses through the application within an emulator or using an instrumented device to search for states of interest. Based on actions the operator takes, the crawler can extrapolate to find similar/parallel actions, each of which may correspond to another state of interest to add to a state list to be crawled.

For example, the operator may browse to a state that lists restaurants, and then select one of the restaurants. The operator may stop after finding a state that shows details about a restaurant. Based on the series of actions taken by the operator during browsing, the crawler can find other restaurant detail states that could have been reached in a similar way.

For example, after selecting a restaurant item with a certain layout and certain properties (e.g. an image with property X next to a text box with property Y) from a list, the crawler may detect multiple additional restaurant items (that have the same layout and/or properties) that the operator could have selected. It may then predict that selecting the other restaurant listings will result in finding additional restaurant info states.

In various implementations, the operator may simply be one or more untrained users who are instructed to use the app to find valuable content. Their interaction with the app, which may be averaged across many users to reduce or eliminate arbitrary diversions by a user, can be used to create guides.

Based on an operator-directed configuration of the guided crawler or user-based guide creation, a configuration file is generated. This essentially records the actions performed by the operator/user. For example only, an example XML (extensible markup language) data structure is shown here for the YELP restaurant review application:

```
<flow>
 <activity name=
   "com.YELP.android.ui.activities.ActivityHome">
  <click class= "android.widget.Button" resourceid=
    "com.YELP.android:id/nearby"/>
 </activity>
 <activity name=
   "com.YELP.android.ui.activities.nearby.ActivityNear
     by">
  <select class= "android.widget.ListView" resourceid=
    "android:id/list" listrow_resource_id=
    "com.YELP.android:id/category_content"/>
 </activity>
 <activity name=
   "com.YELP.android.ui.activities.search.SearchBusine
     ssesByList">
  <select class= "android.widget.ListView" resourceid=
    "com.YELP.android:id/search_content"
    listrow_resource_id=
    "com.YELP.android:id/search_inner_layout"/>
  <!-- If the list doesn't have a resource id then the
    select action will contain leaf node info:
  <select class= "android.widget.ListView" resourceid=
    "com.YELP.android:id/search_content">
  <leaftuples>
  <tuple>android.widget.ImageView,72,72</tuple>
  <tuple>android.widget.TextView,215,19</tuple>
  <tuple>android.widget.ImageView,18,16.5</tuple>
  <tuple>android.widget.TextView,26.0,16.5</tuple>
  <tuple>android.widget.TextView,243,20.5</tuple>
  <tuple>android.widget.TextView,194,19.5</tuple>
  <tuple>android.widget.TextView,15,22</tuple>
  <tuple>android.widget.TextView,260,17.5</tuple>
  </leaftuples>
  </select> -->
  <click class= "android.widget.Button" resourceid=
    "com.YELP.android:id/next_button" />
 </activity>
</flow>
```

In the above example, the user has selected a widget with resource_id "com.YELP.android:id/search_content," which results in launching an activity displaying the restaurant information. The crawler uses this as a guide and now looks for other widgets that match this resource id and/or tuples that describe the layout of the widget. If any other widget in the state matches, a match is reported and the new widget is selected.

Block Diagram

Figure 4:
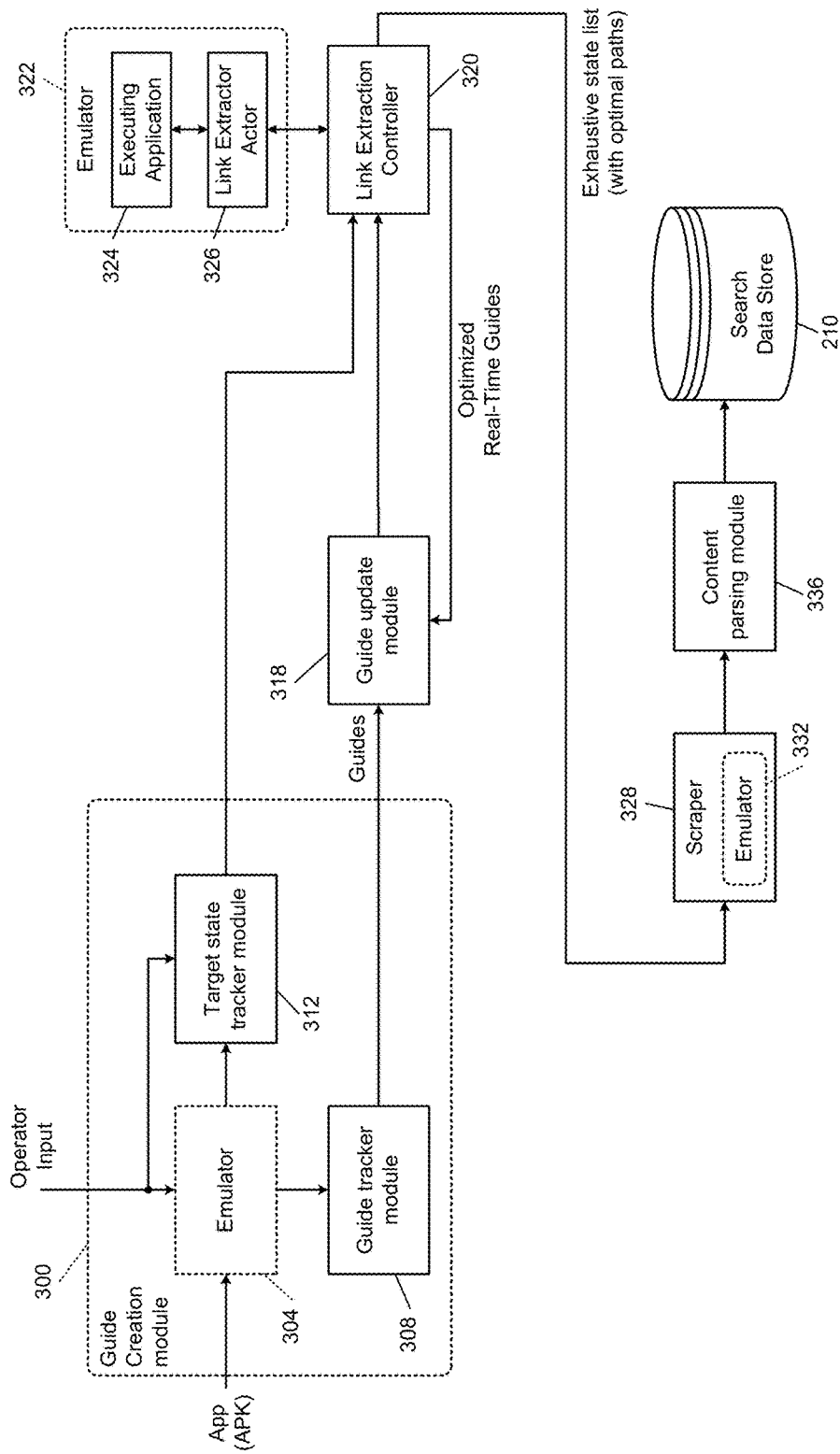
FIG. 4 is a functional block diagram of an operator-guided app crawling infrastructure.

In FIG. 4, a guide creation module 300 includes an emulator 304 that allows for operator interaction with an app of interest. In various other implementations, the app of interest may be installed on a physical device.

A guide tracker module 308 records operator interaction with an app (from, for example, an APK file) in the emulator 304 to create operator-specified guides. For example, a guide may include each user interface interaction performed by the operator, beginning at the home (or, default) state. In various implementations, a target state tracker module 312 may allow the operator to specify target states of interest (as discussed in more detail in FIG. 5). For example, the target state tracker module 312 may provide a user interface element (such as a button) within the emulator 304 or as part of software through which the operator controls the emulator 304.

A guide update module 318 receives the guides generated by the guide tracker module 308 from monitoring the operator input, and updates them based on real-time feedback from a link extraction controller 320. For each state of interest, the link extraction controller 320 generates a breadcrumb trail. The breadcrumb trail identifies the shortest path to reach the state of interest, and includes the programming calls and user interface events necessary to reach the state of interest. In some circumstances, a programming call (referred to as an intent in some contexts) followed by one or more user interface events may be required to reach the target state.

For example, the link extraction controller 320 may identify a programming call that can directly access a target state, rather than having to perform multiple UI operations. Once the data required by the programming call is identified, the programming call may be invoked to transition directly to the target state. This updated guide may be stored as a preferred alternative for the target state by the guide update module 318.

In other words, while navigating between states, if the link extraction controller 320 identifies that an intent is available to reach a state, the link extraction controller 320 passes this information back to the guide update module 318 as an optimized real-time guide for that state. The guide update module 318 may annotate or replace a breadcrumb trail having multiple user interface interactions with an intent that bypasses some or all of the user interface interactions.

In some implementations, the link extraction controller 320 stops at one or more states prior to the eventual target state while identifying other states of interest. In these implementations, the guide update module 318 does not replace the full breadcrumb trail with a direct intent, as then there would be no trail to follow to the intermediate states. The direct intent may still be stored to allow efficient navigation during scraping. In various other implementations, the guide update module 318 may be omitted.

The link extraction controller 320 is aware of states of interest to an operator of the crawling infrastructure, either explicitly (such as via the target state tracker module 312) or implicitly (such as via the guide tracker module 308). The link extraction controller 320 may attempt to identify similar states—for example, states that are reached using similar UI (user interface) elements.

Target states may be explicitly identified by the operator using the target state tracker module 312. If target states are not specified by the operator, the link extraction controller 320 may assume that the final state reached when an operator is creating a guide is the target state. Alternatively, the link extraction controller 320 may make the assumption that every state the operator navigated to should be a target state. These three approaches are described in FIG. 6, FIG. 7, and FIG. 8, respectively.

The link extraction controller 320 operates one or more emulators. For ease of illustration a single emulator 322 is shown in FIG. 4. The emulator 322 emulates an operating system, such as the ANDROID operating system, for the application of interest. In various implementations, the emulator 322 may be instantiated at a cloud hosting operator that may provide compute facilities within which to execute emulator code or that may directly provide emulators for one or more mobile device operating systems.

In other implementations, a physical device running the operating system may be used. For example, some operating systems may not have suitable emulators. The physical device may be connected to the link extraction controller 320 using a wireless or wired interface, such as USB (universal serial bus). For scale, multiple emulators and/or physical devices may be controlled by the link extraction controller 320 to crawl the same or different applications. As an example only, a bank of physical smartphones may all be connected via USB to an interface card that is controlled by the link extraction controller 320.

The application of interest is executed within the emulator 322 at 324. The link extraction controller 320 identifies states of interest corresponding to each of the guides specified by the guide update module 318. In order to reach a state within the executing application 324 corresponding to an activity, the link extraction controller 320 sends the shortest path specified by the guide update module 318 to a link extractor actor 326. The link extraction controller 320 identifies states of interest corresponding to each of the guides specified by the guide update module 318.

The link extractor actor 326 executes within the emulator 322 and communicates with the executing application 324 using accessibility hooks or events. This may involve sending simulating user interface events, such as touches, swipes, and clicks, to the executing application 324. The link extractor actor 326 may also make programming calls to transition directly to states of interest.

The link extractor actor 326 may include a scraping module to provide the link extraction controller 320 with information regarding a state. The link extraction controller 320 can then identify a path to follow from the scraped information and instruct the link extractor actor 326 to follow that path. In other words, the link extractor actor 326 can provide simulated user input to the executing application 324 and extract content from each displayed state of the executing application 324.

In implementations where the emulator 322 is instead a physical device, the link extractor actor 326 may be installed as a root-level application on the physical device. Installing a root-level application may include installing the link extractor actor 326 as a launcher replacement and bypassing security limitations of the firmware or operating system regarding privileges of installed apps.

A deduplication procedure may be used to detect when an operator has browsed in a loop, thus avoiding generating multiple crawler links for the same states. This may be less necessary if the operator is marking target states.

If there are fields into which the crawler has to enter some text, the operator may, during the configuration phase, identify what types of textual input needs to be entered. The types could be, for example, city names, cuisine names, etc. The crawler could then consult a knowledge base to get a list of possible values of such types (for cities, the list might include "Seattle", "San Jose", etc.) and then replay each one of these values into the textual input field.

A set of access paths generated by the link extraction controller 320 based on the user-provided guide may be expressed in an XML data structure as follows:

```
<accesspaths>
    <accesspath targetState= 'ActivityNearby'>
        <action name= 'click' widgetId=
```

```
        'com.YELP.android:id/nearby' text= 'Nearby' />
</accesspath>
<accesspath targetState= 'SearchBusinessesByList'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
</accesspath>
<accesspath targetState= 'ActivityBusinessPage'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widgetId=
      'com.YELP.android:id/search_content' rowId=
      'com.YELP.android:id/search_inner_layout' index=
      '0' />
</accesspath>
<accesspath targetState= 'ActivityBusinessPage'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widgetId=
      'com.YELP.android:id/search_content' rowId=
      'com.YELP.android:id/search_inner_layout' index=
      '1' />
</accesspath>
<accesspath targetState= 'ActivityBusinessPage'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widgetId=
      'com.YELP.android:id/search_content' rowId=
      'com.YELP.android:id/search_inner_layout' index=
      '2' />
</accesspath>
<accesspath targetState= 'ActivityBusinessPage' >
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widgetId=
      'com.YELP.android:id/search_content' rowId=
      'com.YELP.android:id/search_inner_layout' index=
      '3' />
</accesspath>
<accesspath targetState= 'ActivityBusinessPage'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widgetId=
      'com.YELP.android:id/search_content' rowId=
      'com.YELP.android:id/search_inner_layout' in-dex=
      '4' />
</accesspath>
<accesspath targetState= 'ActivityBusinessPage'>
<action name= 'click' widgetId=
      'com.YELP.android:id/nearby' text= 'Nearby' />
<action name= 'select' widgetId= 'android:id/list'
      rowId= 'com.YELP.android:id/category_content'
      index= '0' />
<action name= 'select' widg-etId=
      'com.YELP.android:id/search_content' rowId=
      'com.YELP.android:id/search_inner_layout' in-dex=
      '5' />
</accesspath>
```

A state list including a breadcrumb trail for each state of interest is provided to a scraper 328. The scraper 328 uses an executing instance of the application to (i) reach each of the states of interest by following the corresponding breadcrumb trail and (ii) extract the state's contents. In some implementations, the scraper 328 uses an emulator 332 to execute the application, while in other implementations, the scraper 328 interfaces with a physical device (such as a smartphone) that can execute the application.

Within the emulator 332, the scraper 328 injects specified programming calls and replays user interface events as specified in the breadcrumb trail for each state of interest. Upon arriving at the target state, the scraper 328 extracts text, images, and metadata from the state.

The scraped information is passed to a content parsing module 336. In other implementations, the data from the scraper 328 may be stored directly into a data warehouse or database. The scraper 328 may be implemented as a scrape manager that concurrently runs multiple emulators including the emulator 332. Each of the emulators can then independently traverse paths to different states. The scraping manager therefore distributes the states of interest across the emulators and collates the scraped data.

In some circumstances, the link extraction controller 320 may have identified a single state of interest by following two different breadcrumb trails. When the scraper 328 detects that an already-scraped state has been reached, that breadcrumb trail may be ignored or removed from the state list.

The content parsing module 336 may identify content of interest from scraped states and map that data to specific fields to create app states records in the search data store 210. The content parsing module 336 may perform a combination of parsing, transformation, categorization, clustering, etc. In some implementations, this may be described as an extract-transform-load (ETL) process.

Guide Creation

Figure 5:
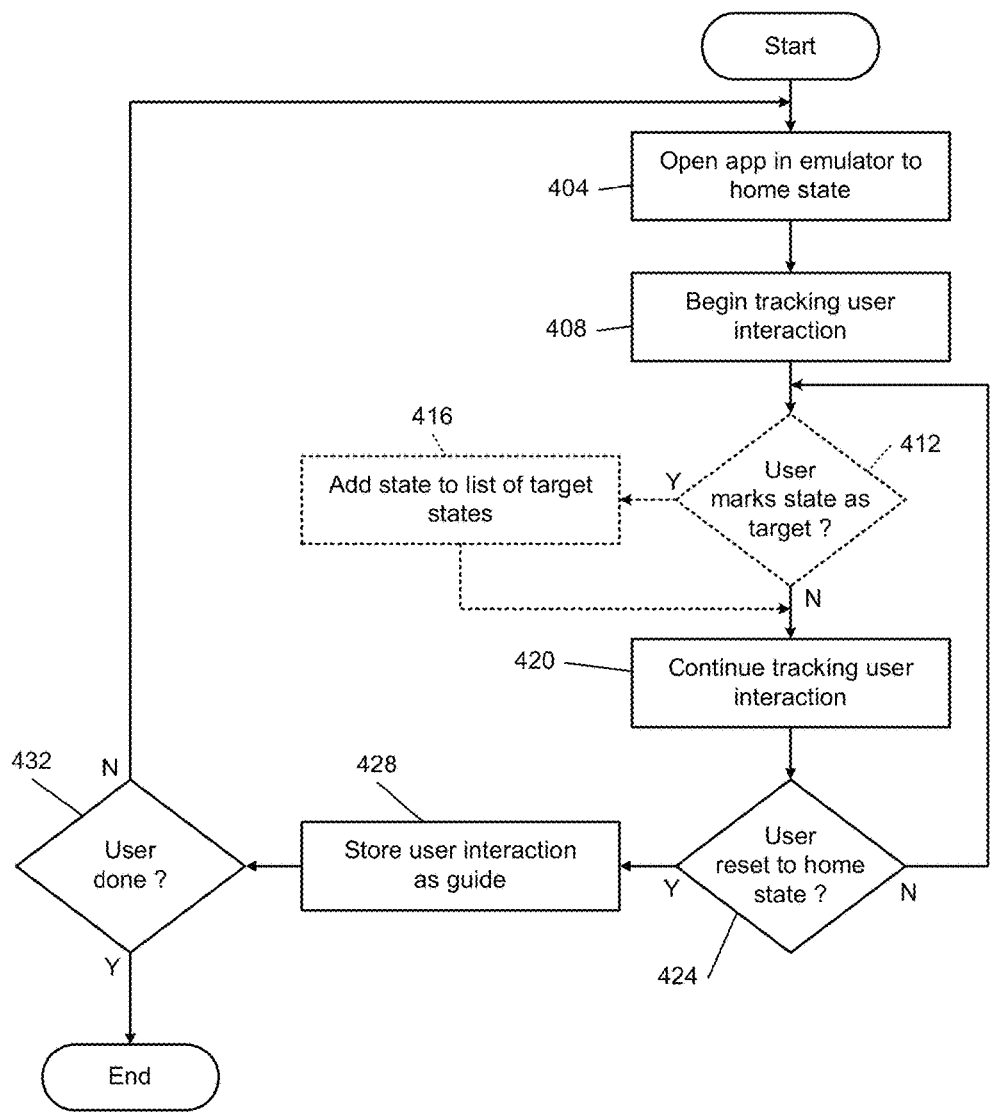
FIG. 5 is a flowchart of example operation of operator-based guide creation.

In FIG. 5, example operation of guide creation by an operator begins at 404, where control opens the subject app in an emulator of the home state of the app. At 408, control begins tracking user interaction with the app, including tracking the user interface elements with which the operator interacts. At 412, if the user marks the present state as a target state, control transfers to 416; otherwise, control transfers to 420. At 416, control adds the state to a list of target states and continues at 420.

At 420, control continues tracking user interaction with the app. At 424, control determines whether the user has signaled that a new guide will be created. The user may signal this by resetting the app to the home state, using either controls within the app itself or controls provided by the emulator. If the user has reset the app to the home state, control transfers to 428; otherwise, control returns to 412. At 428, control stores the tracked user interaction as a guide. Control continues at 432, where if the user is done creating guides, control ends; otherwise, control returns to 404.

Operator-Specified Target States

Figure 6:
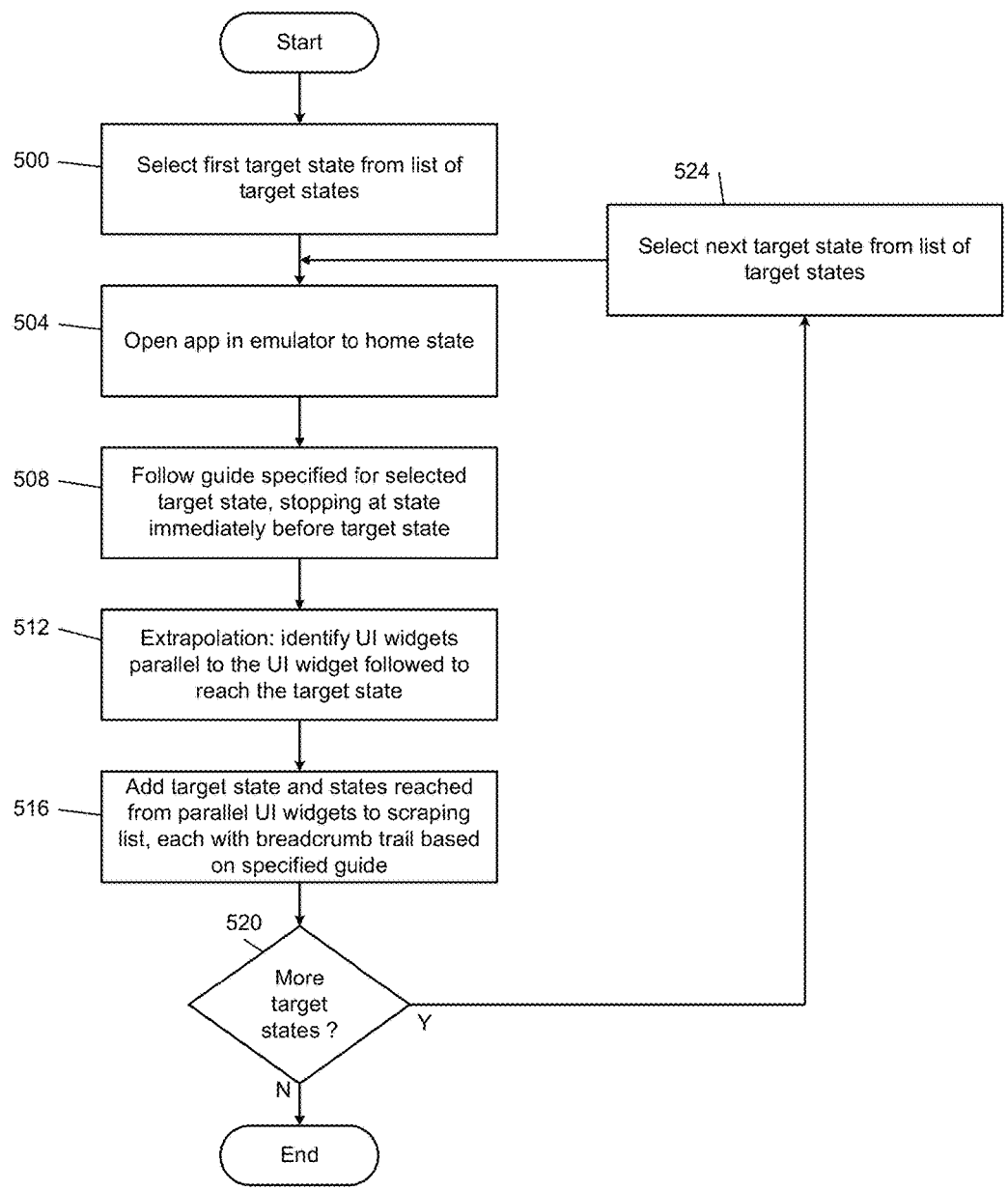
FIG. 6 is a flowchart of example operation of app link extraction based on operator-specified guides and operator-specified target states.

In FIG. 6, example operation of link extraction based on operator-created guides and target states begins at 500. At 500, a first target state is selected from a list of target states, such as those generated by the process of FIG. 5. Control continues at 504, where the app of interest is opened in an emulator to the default (or, home) state.

Control continues at 508, where control follows the guide specified for the selected target state by replaying each user interface event from the guide into the emulator. While following the guide, control stops at the state immediately before the target state. Because traversal of the guide stops before arriving at the target state, guide optimization using an intent that transitions directly to the target state should be avoided at this stage. In some implementations, the guide updating happens after link extraction, which so that the updated guides (and especially direct intents) are used for scraping but not link extraction.

At 512, control performs extrapolation to identify other states similar to the target state. For example, based on the UI widget that is the last step in the guide to reach the target state, control may identify UI widgets that are "parallel." In this context, UI widgets are parallel when they appear likely to point to similarly relevant content as the target state. For example, parallel UI widgets may naturally be other UI widgets within a same array as the UI widget that results in the target state. Many characteristics of the UI widget may be analyzed to determine parallelism, such as width, height, color, font, associated text, the identity of the parent UI element, etc.

Determination of parallelism between UI widgets may vary based on the type of UI widget. For example, text widgets may be compared differently than image widgets. Further, even when a similar comparison algorithm is used, the threshold level for a determination of parallelism may differ based on the type of widget.

Figure 9:
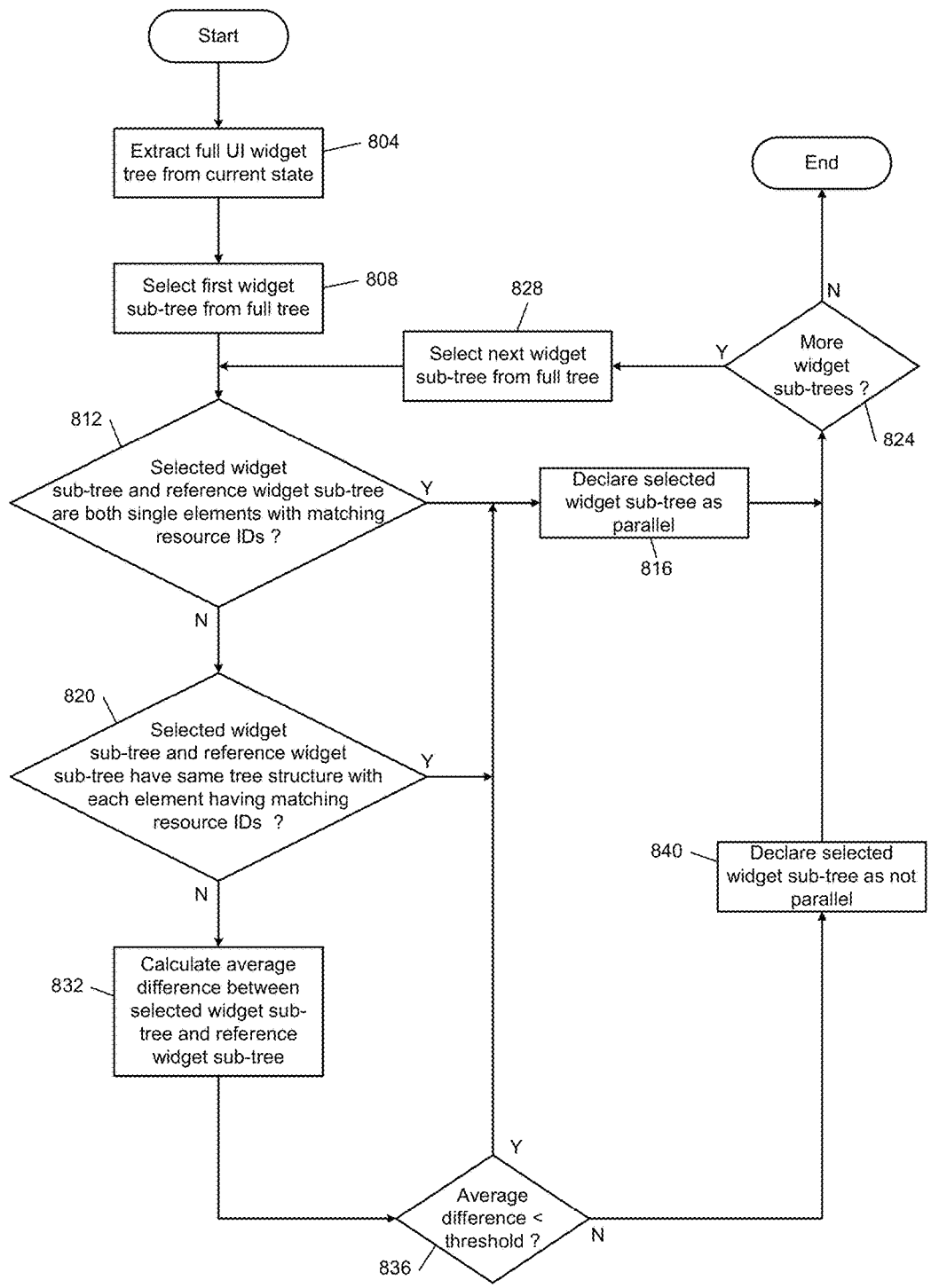
FIG. 9 is a flowchart of example extrapolation from one target state reached via a first state to other states reachable from the first state.

A UI element of interest may actually be a tree of UI widgets. For example, a graphical representation of a card that points to a restaurant may include a text name of the restaurant, an image of the restaurant, selected reviews of the restaurant, a review score of the restaurant, and one or more icons indicating features of the restaurant, such as whether the restaurant is open and what price range the restaurant falls within. Widgets may be nested such that reviews may be a sub-sub-tree within a restaurant listing sub-tree. In FIG. 9, which discusses extrapolation, this tree of elements is compared to the tree of elements pointing to a state of interest to determine whether this new tree is sufficiently similar (or, parallel) to warrant scraping.

Control continues at 516, where control adds the target state as well as the states reachable from the identified parallel UI widgets to a scrape list. Each of the states added to the scrape list is annotated with a breadcrumb trail based on the specified guide, where only the last breadcrumb in each breadcrumb trail will differ between the target state and the states reachable from parallel UI widgets. Control continues at 520, where if there are more target states in the list, control transfers to 524. Otherwise, control ends. At 524, control selects the next target state from the list of target states and continues at 504.

Assume Guide Ends are Target States

Figure 7:
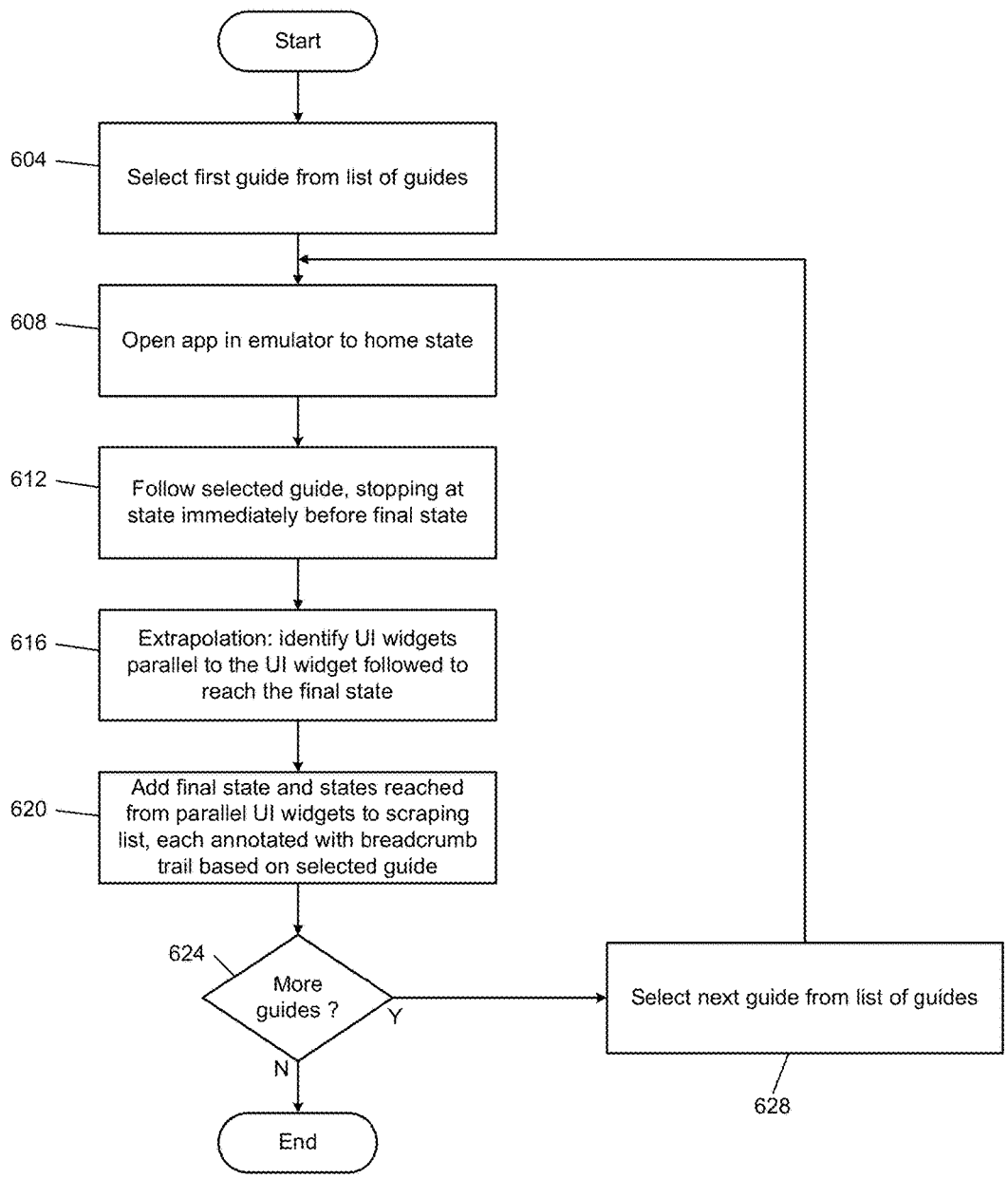
FIG. 7 is a flowchart of example app link extraction for operator-specified guides, with guide endpoints used as target states.

Referring to FIG. 7, the operator may have established a series of guides but not labeled any particular states as target states. For example, in some implementations, the operator may not be presented with an option to designate target states. However, operator-created guides generally begin at a home state and end at a terminal (or, final) state. This final state may be assumed to be the state of interest for scraping. In other words, only terminal states are assumed to be target states; in FIG. 6, each state encountered along a guide is assumed to be a target state.

For example, when an operator is creating guides for a restaurant review application, the operator may create one guide by navigating from the home state to a state containing restaurant information and reviews. This would correctly be assumed to be a desired target state, and the link extraction controller would attempt to find additional states that have similar data for scraping.

Control begins at 604, where a first guide from a list of operator-created guides is selected. At 608, control opens the app to a home state in an emulator. At 612, control follows the selected guide, stopping at the state immediately before the final state. At 616, control performs extrapolation to identify states similar to the final state. Extrapolation may be performed as discussed above. For example, control identifies UI widgets parallel to the UI widget that, when followed according to the selected guide, will reach the final state.

At 620, control adds the final state, as well as states reached from UI widgets identified as parallel, to a scrape list. Each of the added states is annotated with a breadcrumb trail based on the selected guide. The breadcrumb trail for the states other than the final state will diverge from the breadcrumb trail for the final state at the final breadcrumb of each breadcrumb trail. At 624, control determines whether additional guides are present in the list of guides. If so, control transfers to 628; otherwise, control ends. At 628, control selects the next guide from the list of guides and returns to 608.

Assume all States in Guide are Target States

Figure 8:
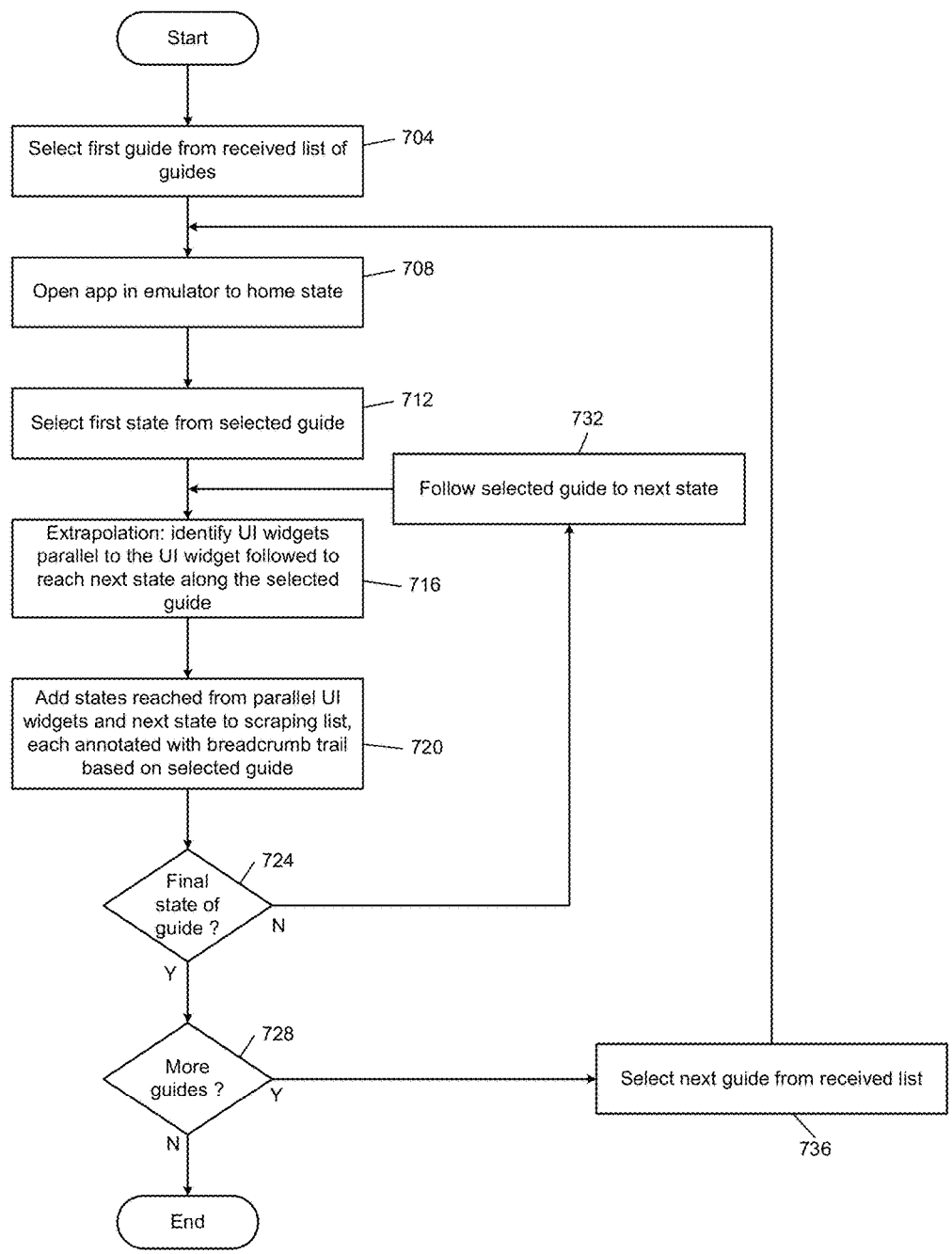
FIG. 8 is a flowchart of example operation of app link extraction for operator-specified guides but with no assumptions of target states.

In FIG. 8, a flowchart depicts app link extraction when guides have been specified by an operator but no assumption is made that only the final state in each guide is of interest for scraping. Instead, each state reached by the operator while establishing guides is considered a target state that should be scraped. Therefore, states apparently similar to those target states should also be identified for scraping.

Control begins at 704, where control selects a first guide from a list of guides created by an operator. At 708, control opens the app to its home state in the emulator. At 712, control selects the first state reached using the selected guide from the home state. At 716, control performs extrapolation to determine states that are similar to the next state along the selected guide. For example, control may identify UI widgets that are parallel to the UI widget that will be followed according to the selected guide to reach the next state.

At 720, control adds the next state along the selected guide, as well as states that are reached from the identified parallel UI widgets, to the scrape list. Each state is annotated with a breadcrumb trail based on a portion of the selected guide. As one example, a selected guide includes five state transitions, and the present next state is only two transitions into the selected guide. The breadcrumb trail for the related states would only have the first transition in common with the selected guide.

At 724, control determines whether the final state of the selected guide has been reached. If so, control transfers to 728; otherwise, control transfers to 732. At 732, control follows the selected guide to the next state and continues at 716. At 728, control determines whether more guides are present in the list of guides. If so, control transfers to 736; otherwise, control ends. At 736, control selects the next guide from the received list and returns to 708.

Widget-Based Extrapolation

FIG. 9 shows example operation for comparing UI widget sub-trees. A state of interest may be reached from a prior state by user selection of a user-selectable widget from a UI widget sub-tree. For example, a deep view card for a restaurant may be a UI widget sub-tree, with various widgets displaying text (such as reviews), indicators of price, an image of the restaurant's logo, and a surrounding border. The state of interest may have been indicated by an operator during guide creation.

The term UI widget sub-tree encompasses a widget and any sub-widgets at lower levels in a tree structure of the widgets of a state. When no sub-widgets are under a widget (making the widget a leaf node), that leaf node can itself be described as a sub-tree. The group of UI widgets that leads to the indicated state of interest may be described as a reference widget sub-tree. If other groups of widgets are similar (by layout, by identity of widgets, by location, by parent node, etc.) to the reference widget sub-tree, a technique called extrapolation infers that these similar groups of widgets also lead to states of interest.

Control begins at 804, where control extracts a full UI widget tree from the current state. For example, the full UI widget tree may include the hierarchical relationship of all of the widgets in the current state as well as identifying information for each of the widgets. The identifying information may include a resource ID and a class. Further, each widget may also be specified by various characteristics, such as size, position, transparency, etc.

At 808, control selects a first sub-tree from the full tree. For example, widget sub-trees may be selected according to a predetermined tree traversal algorithm, such as an in-order traversal or a breadth-first traversal. At 812, control determines whether both the selected widget sub-tree and the reference widget sub-tree are single elements. If so, and if the resource IDs of these two single elements are equal, control transfers to 816; otherwise, control transfers to 820.

At 816, control declares the selected widget sub-tree to be parallel to the reference widget sub-tree. Control then continues at 824. At 824, if additional widget sub-trees can be selected in the traversal of the full tree, control transfers to 828; otherwise, control ends. At 820, control determines whether the selected widget sub-tree includes a tree structure that matches the tree structure of the reference widget sub-tree, including that the resource IDs of each element of each tree structure match. If so, control transfers to 816; otherwise, control transfers to 832.

At 832, control calculates an average difference between the selected widget sub-tree and the reference widget sub-tree. The average difference may be determined by calculating a percentage difference recursively between a count of each resource ID or class type in the selected widget sub-tree compared to the corresponding counts of the reference widget sub-tree. These percentage differences (which may be expressed as a number between zero and one) are averaged to produce the average difference.

At 836, control determines whether the average difference is less than a threshold. If so, control transfers to 816 to declare the selected widget sub-tree as being parallel. Otherwise, control transfers to 840 where the selected widget sub-tree is declared as not being parallel. After either 816 or 840, control continues at 824.

The threshold of 836 may be set to a predetermined value, such as 0.3. In other instances, the threshold may be dynamically adjusted based on, for example, a depth of the selected widget sub-tree or a number of total elements in the selected widget sub-tree. In other implementations, the threshold may be based on characteristics of the reference widget sub-tree, such as the depth or the total number of elements. Still further, the threshold may be based on some combination of the characteristics of the tree structures of the widget sub-tree and the reference widget sub-tree.

EXAMPLE

The widgets in the following table may be indicative of a list. Therefore, if a target state was accessed from a UI element contained within a widget from the following table, it is likely that further states should be extrapolated from the widget:

| #S. NO | Classes | Description |
| --- | --- | --- |
| 1 | AbsListView | A base class that can be used to implement virtualized lists of items. |
| 2 | AdapterViewFlipper | Simple ViewAnimator that will animate between two or more views that have been added to it. |
| 3 | CardView | A FrameLayout with a rounded corner background and shadow. |
| 4 | ExpandableListView | A view that shows items in a vertically scrolling two-level list. |
| 5 | GridView | A view that shows items in two-dimensional scrolling grid. |
| 6 | HorizontalGridView | A view that shows items in a horizontal scrolling list (Sub Class of RecyclerView) |
| 7 | ImageSwitcher | |
| 8 | ListView | A view that shows items in a vertically scrolling list. |
| 9 | TabHost | Container for a tabbed window view. |
| 10 | TabWidget | Displays a list of tab labels representing each page in the parent's tab collection. |
| 11 | VerticalGridView | A view that shows items in a vertically scrolling list (Sub Class of RecyclerView) |
| 12 | ViewPager | |

When one of the above widgets included a UI element pointing to the target state, widgets from the below list may point to states to include in the extrapolation.

| | | |
| --- | --- | --- |
| 13 | Button | Represents a push-button widget. |
| 14 | CheckBox | A checkbox is a specific type of two-state button that can be either checked or unchecked. |
| 15 | CompoundButton | A button with two states, checked and unchecked. |
| 16 | FrameLayout | FrameLayout is designed to block out an area on the screen to display a single item. |
| 17 | GridLayout | A layout that places its children in a rectangular grid. |
| 18 | ImageButton | Displays a button with an image (instead of text) that can be pressed or clicked by the user. |
| 19 | LinearLayout | A Layout that arranges its children in a single column or a single row. |
| 20 | RadioButton | A radio button is a two-state button that can be either checked or unchecked. |
| 21 | RelativeLayout | A Layout where the positions of the children can be described in relation to each other or to the parent. |
| 22 | Switch | A Switch is a two-state toggle switch widget that can select between two options. |
| 23 | TableLayout | A layout that arranges its children into rows and columns. |
| 24 | TableRow | A layout that arranges its children horizontally. |
| 25 | TextView | Displays text to the user and optionally allows them to edit it. |
| 26 | ToggleButton | Displays checked/unchecked states as a button with a "light" indicator and by default accompanied with the text "ON" or "OFF". |

Apps, such as ANDROID operating system apps, may have layout definitions with unique ids (the unique id may also be referred to as a resource-id). During crawling, a combination of unique ids is sequenced to reach a particular state, which may be similar to XPath (XML Path Language).

A matching algorithm may use one or more of the following methods to determine whether a test element is parallel to a reference element identified within an operator-created guide. When multiple methods are used, a weighted average of the scores from the methods may be used as a final score. In other implementations, one or more of the methods may be used as a litmus test that, if failed, indicates that the states are not parallel with sufficient confidence.

In a first method, a selectable widget that does not have a resource-id can be identified by its unique set of leaf nodes.

This unique set forms the pattern to look for in other instances of the same widget. For example only, in a HOTELS.COM accommodation booking app, the list items showing the search results do not have resource-ids. The leaf nodes of a first one of the list items can be grouped by their resource-id and class attributes:

| Leaf group | Count |
|---|---|
| resid = "com.hcom.android:id/ser_res_p_card_current_photo" class = "android.widget.ImageView" | 1 |
| resid = "com.hcom.android:id/ser_res_p_card_hotel_name" class = "android.widget.TextView" | 1 |
| resid = "com.hcom.android:id/ser_res_p_card_price_discounted" class = "android.widget.TextView" | 1 |
| resid = "com.hcom.android:id/ser_res_p_card_price_original" class = "android.widget.TextView" | 1 |
| resid = "com.hcom.android:id/ser_res_p_qualitative_badge" class = "android.widget.TextView" | 1 |
| resid = "com.hcom.android:id/ser_res_p_landmark_distance" class = "android.widget.TextView" | 1 |
| resid = "com.hcom.android:id/ser_res_p_rooms_left" class = "android.widget.TextView" | 1 |
| resid = "com.opentable:id/ratingbar" class = "android.widget.RatingBar" | 1 |
| class = "android.view.View" | 1 |
| resid = "com.hcom.android:id/ser_res_p_card_wr_icon" class = "android.view.View" | 1 |

This grouping forms an input leaf pattern. An unidentified list item would have a leaf pattern similar to this input leaf pattern for the unidentified list item to be considered a match in terms of parallelism. The comparison may involve computing a percentage change of the count of each leaf node in the input pattern and then taking the average of the percentage values:

Let A=input leaf pattern
$A=\{(g_0:c_0), (g_1:c_1), \ldots, (g_{n-1}:c_{n-1})\}$ where
n=number of leaf groups
$g_i$=leaf group i
$c_i$=number of leaf nodes in input leaf pattern matching leaf group $g_i$ (the Count column in the above table)

Let B=leaf pattern of an unidentified list item
$B=\{(g_0:C_0), (g_1:C_1), \ldots, (g_{n-1}:C_{n-1})\}$ where
$g_i$=leaf group i
$C_i$=number of leaf nodes in unidentified leaf pattern matching leaf group $g_i$ Then the percentage change of each leaf group i of the input leaf pattern A compared to unidentified leaf pattern B can be calculated as follows:

$$p_i = \left| \frac{C_i - c_i}{c_i} \right|$$

and the average percentage change between B and A will be $$P = \frac{\sum_{i=0}^{n-1} p_i}{n}$$

In other words, in the above numeric implementation of UI percentage comparison, only the leaf groups present in A are relevant. Leaf groups that appear only in B are ignored. This is consistent with the equation because a leaf group not present in A would have a corresponding $c_i$ of 0, leading to a divide-by-zero error.

In various implementations, the percentage change may be subsequently adjusted based on leaf groups present in B but not in A. For example, the percentage change may be increased by a value calculated by dividing the number of leaf nodes in pattern B that do not match any leaf group from pattern A by the total number of leaf nodes in pattern A.

The average percentage change P will be 0 if the leaf nodes of the input leaf pattern are all present in the unidentified leaf pattern. The average percentage change P can increase above 1.00 (100%) when the number of leaf nodes in the unidentified leaf pattern exceed those of the corresponding groups of the input leaf pattern by more than double.

The average percentage change P can be compared with a threshold and, if less than the threshold, may be considered a successful match. For example only, the threshold may be set at 0.3. If the average percentage change P is less than the threshold, the unidentified list item is recorded in the state list for later scraping. In various implementations, leaf groups may simply be individual UI widget classes. In many UI layouts, a flat list of UI elements is present, so there is no need to compare sub-trees to sub-trees. Instead, a count of widgets having each resource-id from a first UI layout can be compared with a count of widgets having each resource-id from a second UI layout, according to the formula for average percentage change P above.

In a second method, a widget that does not have a resource-id and contains fewer than two leaf widget nodes, or is itself a leaf node, can be matched according to its unique set of parent nodes or by a path to the leaf nodes. The method may depend on the parent widget unique structure/resource-id. The parent path may contain an XPath index (if available) and the link extractor can be computed matching the parents' nodes/path to the node.

In a third method, the selectable widgets that do not have a resource-id can be identified by their unique set of leaf nodes. If the leaf nodes have IDs, they can be assigned a greater weight in the decision of whether the selectable widget is a match or not. Therefore, a count of number of widgets in each class from a first UI layout can be compared with a count of number of widgets in each class from a second UI layout, according to the formula for P above.

Figure 10:
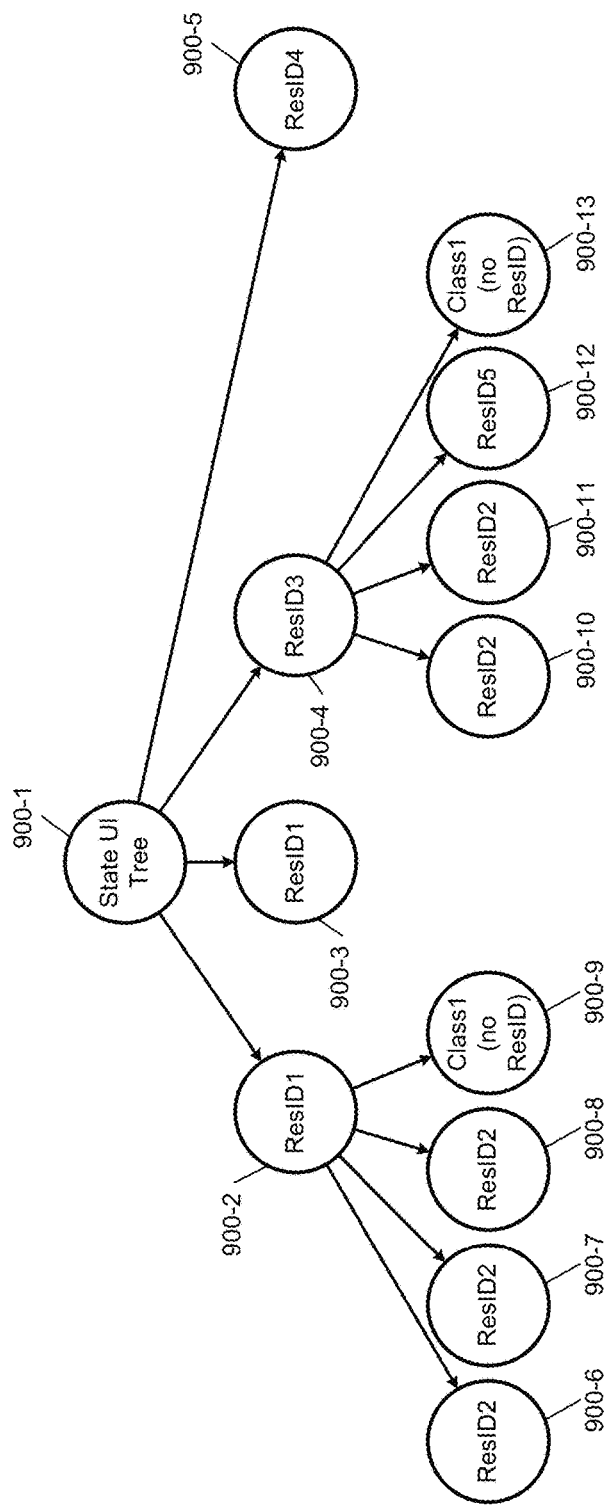
FIG. 10 is a graphical representation of an example widget tree of a fictional application state.

As an example, see FIG. 10, where an example widget tree for an application state is shown. A root node 900-1 has child nodes 900-2, 900-3, 900-4, and 900-5. Each widget may be described using a class identification and a resource ID. When no resource ID is present, only the class identification is used. In various implementations, there are no widgets having different class identifications but with the same resource ID.

The resource IDs are simply shown in FIG. 10 as a single-digit integer but, as shown in the table above, may be strings of characters and may even be human-readable. In this example, the resource IDs for widgets 900-2, 900-3, 900-4, and 900-5 are 1, 1, 3, and 4, respectively. Widget 900-2 has leaf nodes 900-6, 900-7, 900-8, and 900-9. The widgets 900-6, 900-7, and 900-8 each have a resource ID of 2. Meanwhile, widget 900-9 does not have a resource ID and is therefore identified by a widget class. In this simple example, the class identifier is an integer, but as shown above, the class identifier may instead be a string of characters that may indicate a type of widget (such as a checkbox).

Widget 900-4 includes leaf nodes 900-10, 900-11, 900-12, and 900-13. Widgets 900-10 and 900-11 have a resource ID of 2, and widget 900-12 has a resource ID of 5. Widget 900-13 does not have a resource ID and is only identified as widget class 1. As an example, widget subtree 900-2 (which includes leaf nodes 900-6, 900-7, 900-8, and 900-9) displays one search result (such as a restaurant listing) while the widget subtree 900-4 (including leaf nodes 900-10, 900-11, 900-12, and 900-13) displays another search result.

When establishing guides, an operator may have actuated widget 900-8 to proceed to another state, indicating the relevance of widget 900-8. However, the crawling system (and specifically the app link extractor) may not know which other widgets would be similarly relevant. In other words, if the operator selected one result from a list, the operator may have been indicating that all of the list results are relevant.

However, from the widget tree, it may not be clear at what level in the tree the head nodes of the search results are positioned. For example, are widgets 900-6, 900-7, and 900-8 all list results? Or are widget trees 900-2 and 900-4 a pair of list results? If the widget tree of FIG. 10 had additional levels beyond three, there would be even higher levels in the tree hierarchy to compare.

A rule may be established that leaf nodes underneath a common node are not separate entries in a list, but instead are presumed to be different widgets within a single list entry. For example, three pieces of text may each be widgets (for a restaurant entry, this may be operating hours, price description, and dress code note). Therefore, if an operator selected a leaf node when creating a guide, an app link extraction method may move up the tree by one level before beginning comparisons.

In the example of FIG. 10, the method would move up to widget 900-2 before comparing to sibling widgets such as 900-3 and 900-4. If widget 900-2 did not seem to have sufficient commonality with other widgets at the same level, the method would move up to the next level in the tree. However, in FIG. 10, the next level up is the root node so there are no other comparisons that can be made.

Using FIG. 10 as an example, and assuming that the widget sub-tree anchored at widget 900-2 is the input set, while the widget sub-tree anchored at widget 900-4 is the test (or, identified) set, the percentage variation can be calculated as follows:
Input set (under ResID1): {ResID2: 3, Class1: 1}
Test set (under ResID3): {ResID2: 2, Class1: 1}

$$p_1 = \left|\frac{2-3}{3}\right| = 0.33$$

-continued $$p_2 = \left|\frac{1-1}{1}\right| = 0$$

$$P = \frac{0.33 + 0}{2} = 0.165$$

To adjust the percentage P to account for the presence of ResID5, divide the number of nodes in the test set not matching groups in the input set by the total number of nodes in the input set:

$$\Delta = \frac{1}{4} = 0.25$$

This delta value may be added to the calculated P or may first be weighted (such as by a number less than one) before being added to the calculated P. With a scaling factor or 0.5, the resulting adjusted percentage variation is 0.165+0.125=0.29.

Figure 11:
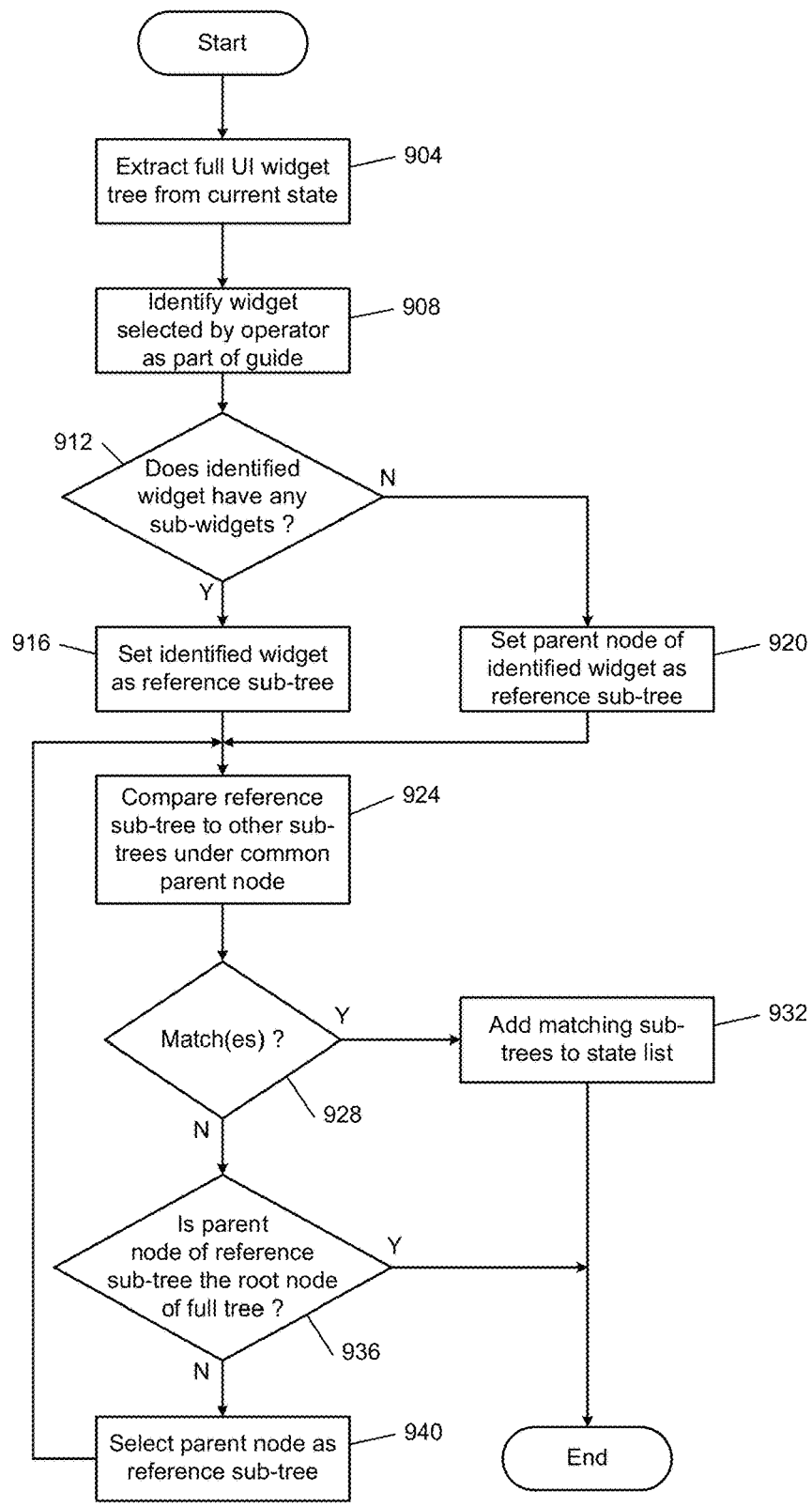
FIG. 11 is a flowchart of example extrapolation from one user interaction to other states of interest.

An example method for extrapolating parallel items within an application state is described in FIG. 11. For example, these parallel items may be deep view cards in a search result list. In a more specific example, the operator may have selected one restaurant listing from a set of restaurant results. The method therefore attempts to identify other entries that appear to be analogous to the entry selected by the operator.

Control begins at 904, where the full UI widget tree is extracted from the current state of the application. Control continues at 908, where control identifies which widget was selected by the operator during guide creation. At 912, control determines whether the identified widget has any sub-widgets. If so, control transfers to 916; otherwise, control transfers to 920. At 916, control sets the identified widget as the reference sub-tree with which other subtrees are compared. Control then continues at 924. Meanwhile, at 920, control sets the parent node of the identified widget as the reference sub-tree and continues at 924.

At 924, control compares the reference sub-tree to other sub-trees that share a common parent node with the reference sub-tree. In other words, the reference sub-tree is compared to other sub-trees rooted at the same level of the widget tree. At 928, control determines whether there is a match between the reference sub-tree and any of the other sub-trees. If so, control transfers to 932; otherwise, control transfers to 936.

At 932, control adds the matching sub-trees to the state list. Specifically, control identifies which element of the matching sub-trees is user-selectable and adds that to a breadcrumb trail so that the state pointed to by the matching sub-tree can be scraped. Control then ends. The matching of 928 may be performed according to any of the above methods, including the percentage difference between UI elements described above.

At 936, control determines whether the parent node of the reference sub-tree is the root node of the full tree. If so, there are no further levels to traverse and control ends. Otherwise, control continues at 940. At 940, control selects the parent node of the reference sub-tree as the new reference sub-tree. Control then returns to 924.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A system for automated acquisition of content from an application, the system comprising:
   a guide tracker module configured to monitor interaction of an operator with an executing instance of the application and record a set of guides, wherein each guide in the set of guides includes a recorded sequence of user interface interactions concluding at a respective ultimate state of the application;
   a link extraction controller configured to, for each guide of the set of guides:
      selectively identify additional states of the application that correspond to the respective ultimate state and add the additional states corresponding to the respective ultimate state and the respective ultimate state to a state list, wherein the additional states and the respective ultimate state are all directly reachable from a common penultimate state of the application, wherein the common penultimate state of the application is immediately prior to the respective ultimate state in the guide, and wherein each entry in the state list designates (i) a state and (ii) a path of user interface interactions to arrive at the state; and a scraper module configured to, within an executing instance of the application, extract text and metadata from the states designated by each of the entries in the state list, wherein information based on the extracted text and metadata is stored in a data store.

2. The system of claim 1 wherein, for each guide in the set of guides, the sequence of user interface interactions begins at a home state of the application.

3. The system of claim 2 wherein the guide tracker module is configured to create a new guide in the set of guides in response to the operator returning to the home state of the application.

4. The system of claim 1 wherein the application is executing within an emulator.

5. The system of claim 4 wherein:
the link extraction controller is configured to execute the application within a second emulator; and
the scraper module is configured to execute the application within a third emulator.

6. The system of claim 1 wherein each path is one of (i) a sequence of user interface interactions, (ii) an application programming interface call, or (iii) an application programming interface call followed by one or more user interface interactions.

7. The system of claim 6 wherein the link extraction controller is configured to (i) identify that an application programming interface call is available to reach a first state directly, (ii) identify parameters for the application programming interface call that specify the first state, and (iii) incorporate the application programming interface call with the identified parameters into the path to the first state.

8. The system of claim 1 wherein the link extraction controller is configured to, for each guide of the set of guides, and for each intermediate state encountered along the guide:
selectively identify additional states of the application that correspond to the intermediate state and
add the additional states corresponding to the intermediate state and the intermediate state to the state list,
wherein the additional states corresponding to the intermediate state and the intermediate state are all directly reachable from a common prior state of the application, and
wherein the common prior state of the application is immediately prior to the intermediate state in the guide.

9. The system of claim 1 further comprising:
a target state tracker module configured to allow the operator to, while recording a guide of the set of guides, designate one or more states encountered along the guide as target states,
wherein the link extraction controller is configured to, for each designated target state:
selectively identify additional states of the application that correspond to the target state and
add the additional states corresponding to the target state and the target state to the state list,
wherein the additional states corresponding to the target state and the target state are all directly reachable from a common prior state of the application, and
wherein the common prior state of the application is immediately prior to the target state in the respective guide.

10. The system of claim 1 wherein the scraper module is configured to, for each entry in the state list, (i) reach the designated state by replaying the corresponding path to the executing application and (ii) extract the text and metadata from the designated state.

11. A search system comprising:
the system of claim 1;
the data store;
a set generation module configured to, in response to a query from a user device, select records from the data store to form a consideration set of records;
a set processing module configured to assign a score to each record of the consideration set of records; and
a results generation module configured to respond to the user device with a subset of the consideration set of records, wherein the subset is selected based on the assigned scores.

12. A method for automated acquisition of content from an application, the method comprising:
monitoring interaction of an operator with an executing instance of the application;
recording a set of guides according to the monitoring, wherein each guide in the set of guides includes a recorded sequence of user interface interactions concluding at a respective ultimate state of the application;
for each guide of the set of guides:
selectively identifying additional states of the application that correspond to the respective ultimate state and
adding the additional states corresponding to the respective ultimate state and the respective ultimate state to a state list,
wherein the additional states and the respective ultimate state are all directly reachable from a common penultimate state of the application,
wherein the common penultimate state of the application is immediately prior to the respective ultimate state in the guide, and
wherein each entry in the state list designates (i) a state and (ii) a path of user interface interactions to arrive at the state; and
within an executing instance of the application, extracting text and metadata from the states designated by each of the entries in the state list, wherein information based on the extracted text and metadata is stored in a data store.

13. The method of claim 12 wherein, for each guide in the set of guides, the sequence of user interface interactions begins at a home state of the application.

14. The method of claim 13 further comprising creating a new guide in the set of guides in response to the operator returning to the home state of the application.

15. The method of claim 12 further comprising executing the application within an emulator.

16. The method of claim 12 further comprising:
executing the application within a first emulator for use in monitoring the interaction of the operator;
executing the application within a second emulator for use in the identifying additional states; and executing the application within a third emulator for use in the extracting text and metadata.

17. The method of claim 12 wherein each path is one of (i) a sequence of user interface interactions, (ii) an application programming interface call, or (iii) an application programming interface call followed by one or more user interface interactions.

18. The method of claim 17 further comprising:
identifying that an application programming interface call is available to reach a first state directly;
identifying parameters for the application programming interface call that specify the first state; and
incorporating the application programming interface call with the identified parameters into the path to the first state.

19. The method of claim 12 further comprising, for each guide of the set of guides, and for each intermediate state encountered along the guide:
selectively identifying additional states of the application that correspond to the intermediate state and
adding the additional states corresponding to the intermediate state and the intermediate state to the state list,
wherein the additional states corresponding to the intermediate state and the intermediate state are all directly reachable from a common prior state of the application, and
wherein the common prior state of the application is immediately prior to the intermediate state in the guide.

20. The method of claim 12 further comprising:
providing a user interface to the operator to allow the operator to, while recording a guide of the set of guides, designate one or more states encountered along the guide as target states; and
for each designated target state:
selectively identifying additional states of the application that correspond to the target state and
adding the additional states corresponding to the target state and the target state to the state list,
wherein the additional states corresponding to the target state and the target state are all directly reachable from a common prior state of the application, and
wherein the common prior state of the application is immediately prior to the target state in the respective guide.

21. The method of claim 12 wherein the extracting and metadata includes, for each entry in the state list, (i) reaching the designated state by replaying the corresponding path to the executing application and (ii) extracting the text and metadata from the designated state.

22. A method of operating a mobile application search system, the method comprising:
the method of claim 12;
in response to receiving a query from a user device, selecting records from the data store to form a consideration set of records;
assigning a score to each record of the consideration set of records; and
responding to the user device with a subset of the consideration set of records, wherein the subset is selected based on the assigned scores, and wherein the subset identifies application states of applications that are relevant to the query.

23. A non-transitory computer-readable medium storing processor-executable instructions configured to perform the method of claim 12.

* * * * *